United States Patent
Wang et al.

(10) Patent No.: US 12,493,163 B2
(45) Date of Patent: Dec. 9, 2025

(54) PERISCOPIC OPTICAL ZOOM MODULE AND ASSEMBLY METHOD THEREFOR, AND CORRESPONDING ADJUSTABLE OPTICAL ASSEMBLY

(71) Applicant: NINGBO SUNNY OPOTECH CO., LTD, Zhejiang (CN)

(72) Inventors: Qi Wang, Zhejiang (CN); Dongli Yuan, Zhejiang (CN); Jiayao Que, Zhejiang (CN); Sisi Yu, Zhejiang (CN); Takehiko Tanaka, Zhejiang (CN); Chengchang Zheng, Zhejiang (CN); Shuhang Chang, Zhejiang (CN); Yinli Fang, Zhejiang (CN); Haipeng Pei, Zhejiang (CN); Yurong Wu, Zhejiang (CN); Xunlong Zhang, Zhejiang (CN); Xinxiang Sun, Zhejiang (CN); Fuwen Liu, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 489 days.

(21) Appl. No.: 17/925,170

(22) PCT Filed: Apr. 7, 2021

(86) PCT No.: PCT/CN2021/085815
§ 371 (c)(1),
(2) Date: Nov. 14, 2022

(87) PCT Pub. No.: WO2021/227705
PCT Pub. Date: Nov. 18, 2021

(65) Prior Publication Data
US 2023/0350159 A1   Nov. 2, 2023

(30) Foreign Application Priority Data

May 13, 2020  (CN) .................. 202010401790.X
May 13, 2020  (CN) .................. 202010402259.4
(Continued)

(51) Int. Cl.
*G02B 23/08*     (2006.01)
*G02B 7/10*      (2021.01)

(52) U.S. Cl.
CPC ............. *G02B 7/102* (2013.01); *G02B 23/08* (2013.01)

(58) Field of Classification Search
CPC ........ G02B 7/102; G02B 23/08; G02B 7/021; G02B 7/09; G02B 15/14; G02B 15/163
(Continued)

(56) References Cited

U.S. PATENT DOCUMENTS

2005/0200973 A1* 9/2005 Kogo ................... G02B 26/004
                                                      359/689
2008/0273251 A1* 11/2008 Huang .................. G02B 7/102
                                                      359/696
(Continued)

FOREIGN PATENT DOCUMENTS

CN         1797057      7/2006
CN         101813817    8/2010
(Continued)

OTHER PUBLICATIONS

International Search Report issued Jul. 14, 2021, in International (PCT) Application No. PCT/CN2021/085815, with English translation.

*Primary Examiner* — Stephone B Allen
*Assistant Examiner* — Leonidas Boutsikaris
(74) *Attorney, Agent, or Firm* — Wenderoth, Lind & Ponack, L.L.P.

(57) ABSTRACT

Provided is an adjustable optical assembly (900), including a bearing base (921), a driving mechanism (910), a zoom
(Continued)

optical assembly (200), and a compensating optical assembly (300). The driving mechanism (910) includes: a bracket (911) having a bottom end connected to the bearing base (921) and a top end having a top groove (911*a*) open upwards; guide rods (912, 913) supported on the top groove (911*a*), the guide rods (912, 913) coinciding with the direction of optical axes of the zoom optical assembly (200) and the compensating optical assembly (300); a zoom bearer (914); a compensating bearer (915); a zoom driving assembly; and a compensating driving assembly. The zoom bearer (914) and the compensating bearer (915) are both mounted on the guide rods (912, 913) and slidable along the guide rods (912, 913). Also provided are a corresponding periscopic optical zoom module and an assembly method therefor. According to the adjustable optical assembly (900), the bracket (911) and the guide rods (912, 913) are disposed on the bearing base (921), thereby effectively ensuring that the moving directions of a zoom group and a compensating group do not deviate from a main optical axis. Moreover, the adjustable optical assembly (900) is compact in structure and convenient to assemble, and facilitates large-scale mass production.

19 Claims, 12 Drawing Sheets

(30) Foreign Application Priority Data

May 13, 2020 (CN) .......................... 202010402261.1
May 13, 2020 (CN) .......................... 202010402284.2

(58) Field of Classification Search
USPC .......................................................... 359/367
See application file for complete search history.

(56) References Cited

U.S. PATENT DOCUMENTS

| | | | |
|---|---|---|---|
| 2010/0214666 A1 | 8/2010 | Fukino | |
| 2012/0050866 A1 | 3/2012 | Umezu | |
| 2013/0329310 A1 | 12/2013 | Toyama et al. | |
| 2015/0215542 A1* | 7/2015 | Nomura | H04N 23/55 348/208.11 |
| 2017/0031137 A1 | 2/2017 | Shi | |
| 2017/0261723 A1 | 9/2017 | Sun et al. | |
| 2021/0063680 A1* | 3/2021 | Kim | G03B 13/36 |

FOREIGN PATENT DOCUMENTS

| | | |
|---|---|---|
| CN | 102385133 | 3/2012 |
| CN | 102809805 | 12/2012 |
| CN | 103336352 | 10/2013 |
| CN | 103472561 | 12/2013 |
| CN | 103576418 | 2/2014 |
| CN | 204331243 | 5/2015 |
| CN | 104865773 | 8/2015 |
| CN | 105068228 | 11/2015 |
| CN | 205027962 | 2/2016 |
| CN | 106019563 | 10/2016 |
| CN | 106161884 | 11/2016 |
| CN | 107517285 | 12/2017 |
| CN | 107783243 | 3/2018 |
| CN | 208581286 | 3/2019 |
| CN | 208969313 | 6/2019 |
| CN | 110501801 | 11/2019 |
| CN | 110581935 | 12/2019 |
| CN | 110873968 | 3/2020 |
| CN | 110933208 | 3/2020 |
| EP | 1 674 909 | 6/2006 |
| JP | 2002-023037 | 1/2002 |
| JP | 2005-292763 | 10/2005 |
| TW | I593998 | 8/2017 |

* cited by examiner

PERISCOPIC OPTICAL ZOOM MODULE AND ASSEMBLY METHOD THEREFOR, AND CORRESPONDING ADJUSTABLE OPTICAL ASSEMBLY

CROSS-REFERENCE TO RELATED APPLICATIONS

The present application claims priorities to Chinese Patent Application No. 202010401790.X, entitled "Periscopic Optical Zoom Module and Corresponding Adjustable Optical Assembly", filed on May 13, 2020, Chinese Patent Application No. 202010402284.2, entitled "Fixed Optical Assembly, Periscopic Optical Zoom Module and Assembly Method therefor", filed on May 13, 2020, Chinese Patent Application No. 202010402259.4, entitled "Periscopic Optical Zoom Lens and Module", filed on May 13, 2020, and Chinese Patent Application No. 202010402261.1, entitled "Periscopic Optical Zoom Module", filed on May 13, 2020, which are hereby incorporated by reference in its entirety.

FIELD OF THE INVENTION

The present disclosure relates to the technical field of camera modules and, in particular, to a periscopic optical zoom module and an assembly method therefor, and a corresponding adjustable optical assembly.

BACKGROUND OF THE INVENTION

With the rising of living standards, consumers have higher requirements for the camera function of mobile phones, tablet computers and other terminal devices. Consumers not only require the realization of background blurring, night shooting and other effects, but also put forward a demand for telephoto, so as to clearly take distant pictures with terminal devices.

In order to realize taking pictures at different distances, current terminal devices on the market realize zoom shooting by means of an array module composed of a wide-angle lens and a telephoto lens. However, since the lens is usually a fixed focus lens and has a non-adjustable focal length, digital zooming can only be realized by performing an algorithm such as differential processing on an image intercepted by a photosensitive chip, and the imaging quality of a picture is poor. Even if some terminal devices use a lens with an auto focus (AF) function to achieve auto focus and improve the shooting effect of the terminal devices, the focusing can usually optimize the image formed by the lens but cannot adjust the focal length of an optical system, so that the demands of consumers for zoom shooting cannot be met.

On the other hand, optical zoom is an imaging module for realizing zoom shooting. The optical zoom is to change the focal length of a lens by changing the distance between optical lenses of the lens so as to achieve zoom, whereby a distant object can be clearly shot, and the imaging quality of an image formed is relatively high. The zoom here refers to changing the focal length in order to shoot scenery at different distances. Further, periscopic modules are often used in mobile phones and other terminal devices to meet the demands of telephoto, and how to make periscopic modules capable of optical zoom in the limited space of mobile phones is a big problem currently faced.

Therefore, there is an urgent need for a solution for a miniaturized periscopic module that enables continuous optical zoom.

Further, compared with a common camera module, a periscopic continuous optical zoom module has numerous optical elements and structural members, and the assembly difficulty thereof is greatly increased under the premise of a very limited space. In the manufacturing process of an optical imaging lens, the influencing factors of lens resolution include errors of various elements and assembly thereof, thickness errors of lens gap elements, assembly fit errors of various lenses, and the change of refractive index of lens materials, etc. The errors of various elements and assembly thereof include errors such as the thickness of an optical surface of a single lens, rise of the optical surface of the lens, the surface type of the optical surface, the radius of curvature, the eccentricity between the single surface and the surface of the lens, and the inclination of the optical surface of the lens. The magnitude of these errors depends on the control capability of the mold precision and the molding precision. The thickness errors of lens gap elements depend on the machining precision of the elements. The assembly fit errors of various lenses depend on the dimensional tolerances of assembled elements and the assembly precision of the lens. The errors introduced by the change of refractive index of lens materials depend on the stability of the material and the batch consistency. There is an accumulative deterioration in the errors of the above various elements affecting the resolution, and this accumulative error increases as the number of lenses increases. The structure of a periscopic continuous optical zoom module is more complicated, and the accumulation of errors affecting the resolution of various optical elements is more difficult to control. On the other hand, since a periscopic camera module has a more complicated structure, during the assembly process thereof, a new error (which may be referred to as an assembly error) may be introduced into an optical system in the assembly process of various structural members of the module, and such an assembly error may result in that the resolution of the final imaging of the module cannot reach a given specification, thereby causing a low yield of the module factory.

Therefore, there is an urgent need for a solution for a miniaturized periscopic camera module that achieves continuous optical zooming and can be assembled with high precision.

SUMMARY OF THE INVENTION

In view of the disadvantages of the related art, the present disclosure aims to provide a solution for a periscopic lens and a camera module that can achieve continuous optical zooming and can be miniaturized.

In order to solve the above technical problem, the present disclosure provides an adjustable optical assembly for an optical zoom module. The adjustable optical assembly includes: a bearing base, a driving mechanism, a zoom optical assembly, and a compensating optical assembly. The driving mechanism includes: a bracket having a bottom end connected to the bearing base and a top end having a top groove open upwards; guide rods supported on the top groove and coinciding with the direction of optical axes of the zoom optical assembly and the compensating optical assembly; a zoom bearer having a first through hole, the zoom optical assembly being mounted in the first through hole; a compensating bearer having a second through hole, the compensating optical assembly being mounted in the second through hole; a zoom driving assembly including a zoom coil and a zoom magnetic element; and a compensating driving assembly including a compensating coil and a compensating magnetic element. The zoom bearer is mounted on the guide rod and slidable along the guide rod under the drive of the zoom driving assembly. The compensating bearer is mounted on the guide rod and slidable along the guide rod under the drive of the compensating driving assembly. The zoom coil and the zoom magnetic element are fixed to the bearing base and the zoom bearer respectively. The compensating coil and the compensating magnetic element are fixed to the bearing base and the compensating bearer respectively.

The height of a top surface of the guide rod does not extend beyond a top surface of the zoom bearer; or the height of the top surface of the guide rod is higher than the top surface of the zoom bearer, and a height difference between the top surface of the guide rod and the top surface of the zoom bearer is not more than 0.4 mm.

The first through hole is in a cut circle shape formed by cutting the top and bottom of a circle.

The guide rod includes a first guide rod and a second guide rod. The zoom bearer has a top side, a bottom side, a driving side, and a driven side facing away from the driving side. The zoom driving assembly is disposed on the driving side. The first guide rod is disposed on the driven side, and the second guide rod is disposed on the driving side.

The top side, bottom side and driven side of the zoom bearer have a top side wall, a bottom side wall and a driven side wall, respectively, and the top side wall and the bottom side wall have a smaller thickness than the driven side wall.

The driven side and driving side of the zoom bearer both have a guide rod mounting structure adapted to mount the first guide rod or the second guide rod.

The guide rod mounting structure is a lateral guide rod slot, and an opening direction of the lateral guide rod slot is perpendicular to an opening direction of the top groove of the bracket.

The guide rod mounting structure is a guide rod through hole through which the guide rod passes.

The guide rod through hole has a rounded triangular cross-section, and a ball is disposed between the guide rod and the guide rod through hole.

The guide rod mounting structure includes a guide rod through hole or a guide rod slot. The driving side of the zoom bearer has the guide rod through hole through which the guide rod passes, the driven side of the zoom bearer has the lateral guide rod slot, and an opening direction of the lateral guide rod slot is perpendicular to an opening direction of the top groove of the bracket.

The driving side of the zoom bearer has a groove-like structure in which the zoom magnetic element is embedded fixedly.

The zoom coil is fixed to the bearing base, the shape of the zoom magnetic element is plate-like, and the zoom magnetic element has a surface facing the zoom coil.

The second through hole is in a cut circle shape formed by cutting the top and bottom of a circle.

The guide rod includes a first guide rod and a second guide rod. The compensating bearer has a top side, a bottom side, a driving side, and a driven side facing away from the driving side. The compensating driving assembly is disposed on the driving side. The first guide rod is disposed on the driven side, and the second guide rod is disposed on the driving side.

The top side, bottom side and driven side of the compensating bearer have a top side wall, a bottom side wall and a driven side wall, respectively, and the top side wall and the bottom side wall have a smaller thickness than the driven side wall.

The driven side and driving side of the compensating bearer both have a guide rod mounting structure adapted to mount the first guide rod or the second guide rod.

The guide rod mounting structure includes a guide rod through hole or a guide rod slot. The driving side of the zoom bearer has the guide rod through hole through which the guide rod passes, the driven side of the zoom bearer has the lateral guide rod slot, and an opening direction of the lateral guide rod slot is perpendicular to an opening direction of the top groove of the bracket. The guide rod through hole has a rounded triangular cross-section, and a ball is disposed between the guide rod and the guide rod through hole.

The compensating bearer has a magnetic element mounting structure formed by extending outwards across the underneath of the second guide rod. The compensating magnetic element is a bar magnet having an axis coinciding with the optical axis of the compensating optical assembly, and the bar magnet has an end connected to the magnetic element mounting structure and a free end, and is capable of extending into the compensating coil.

The adjustable optical assembly includes a housing including the bearing base and a cover adapted to the bearing base.

The bearing base includes a pad assembly, and the zoom driving assembly and the compensating driving assembly are both electrically connected to the exterior through the bearing base.

According to another aspect of the present disclosure, there is also provided a periscopic optical zoom module including: a fixed optical assembly including a light turning element; the adjustable optical assembly according to any of the foregoing, the zoom optical assembly being disposed between the light turning element and the compensating optical assembly; and a photosensitive assembly, the compensating optical assembly being disposed between the zoom optical assembly and the photosensitive assembly.

The photosensitive assembly includes a circuit board body, a photosensitive element mounted on a surface of the circuit board body, a color filter bracket located on the surface of the circuit board body and surrounding the photosensitive element, and a color filter element mounted on the color filter bracket.

The color filter bracket is a molding portion formed directly on the surface of the circuit board body based on a molding process, and the molding portion covers an electronic element mounted on the surface of the circuit board body and located at outer side of the photosensitive element.

The circuit board body is connected to a connector through a first connecting band and further connected to a driving circuit board through a second connecting band, a driving circuit for the zoom driving assembly and the compensating driving assembly is disposed in the driving circuit board, and the driving circuit is electrically connected to the photosensitive assembly through the second connecting band.

The adjustable optical assembly includes a housing including the bearing base and a cover adapted to the bearing base. The driving circuit board is disposed on a side surface of the housing, and is electrically connected to the zoom driving assembly and the compensating driving assembly.

The guide rod includes a first guide rod and a second guide rod. The second guide rod is located on the driving side where the zoom driving assembly and the compensating driving assembly are disposed, and the first guide rod is located on the driven side facing away from the zoom driving assembly and the compensating driving assembly. The bracket includes a first bracket for supporting the first guide rod and a second bracket for supporting the second guide rod, the first bracket is columnar, and the second bracket includes a columnar supporting portion and a baffle plate which is formed by extending from the columnar supporting portion to the driving side and adapted to separate the respective moving ranges of the zoom bearer and the compensating bearer.

Compared with the related art, the present application has at least one of the following technical effects:

1. The periscopic modular structure of the present application can achieve continuous optical zoom at a small spatial cost.

2. The adjustable optical assembly of the present application is compact in structure and convenient to assemble, and facilitates large-scale mass production.

3. In the adjustable optical assembly of the present application, the bracket and the guide rods are disposed on the bearing base, thereby effectively ensuring that the moving directions of a zoom group and a compensating group do not deviate from a main optical axis.

4. In the present application, by controlling the setting height of the guide rods, it can be ensured that the adjustable optical assembly and the corresponding periscopic module have a smaller height, so that it is convenient for an electronic device (such as a mobile phone) to carry the corresponding periscopic module, and the thickness increase of the electronic device (such as the mobile phone) is avoided.

5. In the present application, the movement of the zoom group and the compensating group can be driven by disposing the driving circuits on the bearing base, and since these driving circuits are disposed on the bearing base, excessive wiring of the circuit board in the photosensitive assembly can be avoided, which helps to reduce the size of the circuit board.

6. In the present application, the movement of the zoom group and the compensating group can be driven by disposing the driving circuit on the bearing base, so that the driving circuit can be separated from a functional circuit in the circuit board of the photosensitive assembly, and the driving circuit can be designed with a larger line width, thereby providing a larger driving force for the movement of the zoom group and the compensating group.

7. In the present application, guide rod mounting structures can be disposed on both sides of mounting holes of the zoom bearer and the compensating bearer, so that the wall thickness at the top and bottom of the mounting holes can be minimized, thereby effectively reducing the height of the adjustable optical assembly or the periscopic module.

DETAILED DESCRIPTION OF THE INVENTION

Figure 1:
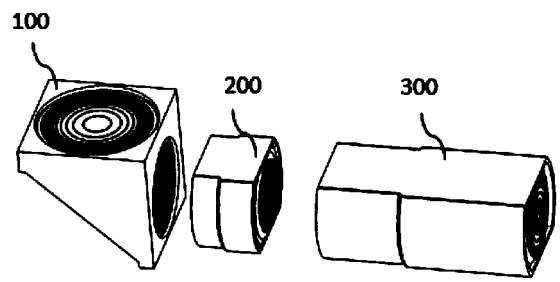
FIG. 1 shows a schematic stereogram of a periscopic optical zoom lens in one example of the present application.

For a better understanding of the present application, various aspects thereof will be described in more detail with reference to the accompanying drawings. It should be understood that these detailed descriptions are merely illustrative of exemplary implementations of the present application and are not intended to limit the scope of the present application in any way. Like reference numerals refer to like elements throughout the specification. The expression "and/or" includes any and all combinations of one or more of the associated listed items.

It should be noted that the expressions first, second, etc. are used only for distinguishing one feature from another and do not imply any limitation of the features in this specification. Accordingly, a first subject discussed below may also be referred to as a second subject without departing from the teachings of the present application.

In the drawings, the thickness, size and shape of objects have been slightly exaggerated for ease of illustration. The drawings are merely exemplary and are not strictly drawn to scale.

It will be further understood that the terms "comprise", "comprising", "have", "include", and/or "including", when used in this specification, specify the presence of stated features, integers, steps, operations, elements, and/or components, but do not preclude the presence or addition of one or more other features, integers, steps, operations, elements, components, and/or combinations thereof. Furthermore, when an expression such as "at least one of . . . " appears before a list of listed features, the entire list of features is modified instead of modifying individual elements in the list. Furthermore, when describing implementations of the present application, "may" is used to mean "one or more implementations of the present application". Also, the term "exemplary" is intended to mean examples or illustrations.

As used herein, the terms "substantially", "approximately", and the like are used as terms for representing approximation and not as terms for representing degree, and are intended to account for inherent variations in measured or calculated values that would be recognized by those ordinarily skilled in the art.

Unless defined otherwise, all terms (including technical and scientific terms) used herein have the same meaning as commonly understood by those ordinarily skilled in the art to which the present application belongs. It will be further understood that terms (such as those defined in commonly used dictionaries) should be interpreted as having a meaning that is consistent with their meaning in the context of the related art and will not be interpreted in an idealized or overly formal sense unless expressly so defined herein.

It should be noted that examples in the present application and features in the examples may be combined with each other without conflict. The present application will now be described in detail in connection with the examples with reference to the accompanying drawings.

The present disclosure will now be further described with reference to the accompanying drawings and specific examples. In order to make the structure clear and easy to read, the following description is divided into three parts: optical design, structural design and assembly solution.

1. Optical Design

According to one example of the present application, a periscopic continuous optical zoom lens (sometimes referred to simply as a periscopic optical zoom lens) is provided. FIG. 1 shows a schematic stereogram of a periscopic optical zoom lens in one example of the present application. Referring to FIG. 1, in the present example, the periscopic optical zoom lens 1000 includes a fixed optical assembly 100 and an adjustable optical assembly for achieving continuous optical zoom. The adjustable optical assembly includes a driving mechanism, a zoom optical assembly 200 and a compensating optical assembly 300. The driving mechanism includes a driving element and an adjustable assembly housing. The driving element is adapted to respectively drive the zoom optical assembly 200 and the compensating optical assembly 300 to move along an x-axis relative to the adjustable assembly housing. In the present example, the x-axis may coincide with the direction of a main optical axis of an optical imaging system of the lens. The zoom optical assembly 200 has an optical axis, and the zoom optical assembly 200 is adapted to move in the direction of the optical axis thereof, so as to realize a zoom function of a telephoto lens. The compensating optical assembly 300 also has an optical axis, and the compensating optical assembly 300 is also adapted to move in the direction of the optical axis thereof, so as to realize a focusing function of the lens, and compensate a focus offset caused by the movement of the zoom optical assembly 200, so as to improve the imaging quality of the lens. The directions of the optical axis of the zoom optical assembly 200 and the optical axis of the compensating optical assembly 300 substantially coincide, and an optical axis of an optical system formed by combining a light exiting side of the fixed optical assembly 100, the zoom optical assembly 200 and the compensating optical assembly 300 may be regarded as the main optical axis of the optical imaging system in the present example. The direction of the main optical axis may also substantially coincide with the directions of the respective optical axes of the zoom optical assembly 200 and the compensating optical assembly 300, i.e. substantially coincide with the direction of the x-axis. By adjusting the zoom optical assembly 200 and the compensating optical assembly 300 respectively, it is possible to achieve continuous optical zoom of the lens while ensuring clear imaging. It should be noted that only the fixed optical assembly 100, the zoom optical assembly 200 and the compensating optical assembly 300 are shown in FIG. 1 for clarity of the drawing, while the driving element and the adjustable assembly housing are not shown in FIG. 1.

Further still referring to FIG. 1, in one example of the present application, the periscopic continuous optical zoom lens is a telephoto lens. The zoom optical assembly 200 is located between the fixed optical assembly 100 and the compensating optical assembly 300. The compensating optical assembly 300 is closer to a photosensitive chip for receiving light from the telephoto lens than the zoom optical assembly 200, i.e. the compensating optical assembly 300 is located on an image side of the telephoto lens. In other implementations, however, the positions of the zoom optical assembly 200 and the compensating optical assembly 300 may be interchanged, i.e. the zoom optical assembly 200 may be closer to the photosensitive chip than the compensating optical assembly 300.

Figure 2:
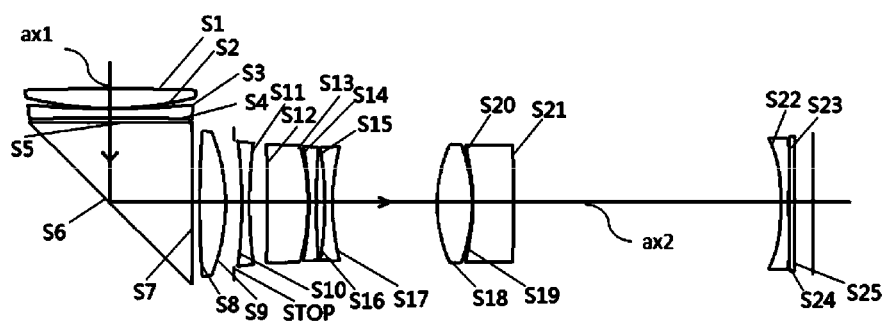
FIG. 2 shows a schematic optical path diagram of a periscopic continuous optical zoom lens in one example of the present application.

Further, in one example of the present application, the zoom optical assembly includes a zoom lens barrel and at least one optical lens. The zoom lens barrel has a through hole for mounting the at least one optical lens such that the at least one optical lens is fixed in the zoom lens barrel. Specifically, in the present example, the zoom optical assembly may include four optical lenses which are assembled together to form a zoom lens group by the zoom lens barrel. FIG. 2 shows a schematic optical path diagram of a periscopic continuous optical zoom lens in one example of the present application. Referring to FIG. 2, in the present example, a zoom lens group (sometimes referred simply to as a zoom group) may include eight optical surfaces, i.e. optical surfaces SS10-S17. Each lens has two optical surfaces. All lenses of the zoom lens group may together adjust the positions on an optical axis (the direction of the optical axis coincides with the x-axis in the present example). The compensating optical assembly may include a compensating lens barrel and at least one optical lens. The compensating lens barrel has a through hole for mounting the at least one optical lens such that the at least one optical lens is fixed in the compensating lens barrel. Still referring to FIG. 2, in the present example, the compensating optical assembly may include three optical lenses that may be assembled together and moved together along an optical axis (referred to as the x-axis) by the compensating lens barrel. The three optical lenses of the compensating optical assembly may constitute a compensating lens group (sometimes referred simply to as a compensating group). In the present example, the compensating lens group may include a total of six optical surfaces, i.e. optical surfaces S18-S23. Further, the fixed optical assembly may include a fixed lens barrel and at least one optical lens. Referring to FIG. 2, the number of optical lenses in the fixed optical assembly in the present example may be three (in other examples, other numbers are possible). Since the telephoto lens is relatively long, it is difficult to put into a relatively light and thin terminal device such as a mobile phone. In the present example, the fixed optical assembly further includes a light turning element. The light turning element is adapted to turn light entering the fixed optical assembly at an angle near 90° and make the light exit from an exiting surface of the fixed optical assembly, so as to enter the zoom optical assembly and the compensating optical assembly. In this way, an entering side of the fixed optical assembly has a first optical axis ax1, an exiting side thereof has a second optical axis ax2, and the second optical axis ax2 is substantially perpendicular to the first optical axis ax1. The direction of the second optical axis ax2 substantially coincides with the direction of the optical axes of the zoom optical assembly and the compensating optical assembly, i.e. both substantially coinciding with the direction of the x-axis. For ease of description, the optical axis of an optical path formed by the light-exiting portion of the fixed optical assembly, the zoom optical assembly and the compensating optical assembly is sometimes referred to herein as the main optical axis of the optical zoom lens (or the main optical axis of the optical zoom module). Referring to FIG. 2, in the present example, the fixed optical assembly may include nine optical surfaces S1-S9. The optical surfaces of the fixed lens include S1-S4 and optical surfaces S8-S9, and optical surfaces S5-S7 are an entering surface, a reflecting surface and an exiting surface of the light turning element, respectively. Further, two optical surfaces S24-S25 of a color filter are also shown in FIG. 2.

Further, in one example of the present application, at least two of the three optical lenses of the fixed optical assembly have a positive focal length to allow convergence of light, so that the light turning element at the rear end thereof may be selected to have a relatively small size, thereby reducing the overall size of the lens. Further, the focal length of the fixed optical assembly may be positive, the focal length of the zoom optical assembly may be negative, and the focal length of the compensating optical assembly may be negative.

Further, in one example of the present application, the light turning element may be a reflecting mirror or a reflecting prism (e.g. a triangular prism). When the light turning element is implemented as a prism, an entering surface and light exiting surface of the prism are perpendicular to each other, a light reflecting surface of the prism is inclined at an angle of 45° to the light entering surface and the light exiting surface, and the light reflecting surface can totally reflect light entering from the light entering surface, so that the entering light is turned by 90° and then exits from the light exiting surface.

Figure 3:
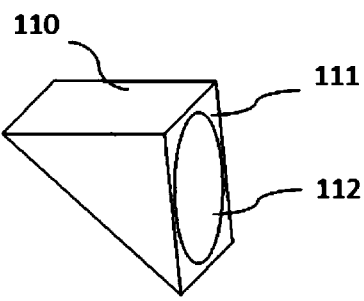
FIG. 3 shows a schematic stereogram of a light turning element in one example of the present application.

Further, FIG. 3 shows a schematic stereogram of a light turning element in one example of the present application. Referring to FIG. 3, in one example of the present application, the prism as the light turning element 110 may further have a light blocking structure 111. The light blocking structure 111 may be mounted on the light entering surface or light emitting surface 112 of the prism, and in particular, the blocking structure may be mounted to cover an edge of the prism, thereby preventing light from entering the edge of the prism to form stray light. The light blocking structure is adapted to block transmission of light, at least visible light. The light blocking structure has a through hole adapted to allow efficient light transmission of the telephoto lens through the prism. Preferably, the through hole is circular to match a circular effective optical area of the optical lens to minimize the influence of stray light on the imaging of the lens.

Further, in one example of the present application, the light blocking structure may be disposed on both side surfaces of the prism that do not participate in optical path imaging, and may be disposed on the light reflecting surface of the prism. The blocking structure may be implemented as a black Mylar sheet that may be adhered to the prism. In another example of the present application, the blocking structure may be formed using ink application.

Further, in one example of the present application, the fixed optical assembly includes at least two optical lenses. In optical design, adjacent optical lenses in the at least two optical lenses of the fixed optical assembly may have a large gap therebetween. In this way, the light turning element may be placed between the two lenses such that the optical path of the light in the light turning element (which may be, for example, the prism) is substantially equal to the gap between the two lenses in the optical design, thereby reducing the size of the telephoto lens while achieving optical path turning of the telephoto lens. It should be noted that in the present example, there may be a slight gap (light-entering gap) between the light-entering lens and the light entering surface of the prism, and there may also be a slight gap (light-exiting gap) between the light-exiting lens and the light exiting surface of the prism. The light-entering gap and the light-exiting gap may be retained to facilitate assembly of the fixed optical assembly.

Figure 4:
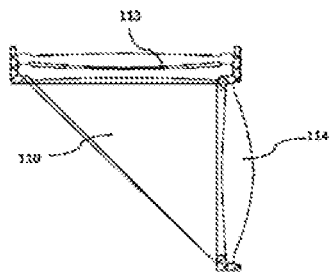
FIG. 4 shows a schematic side diagram of a fixed optical assembly in one example of the present application.

More specifically, FIG. 4 shows a schematic side diagram of a fixed optical assembly in one example of the present application. Referring to FIG. 4, in the present example, the light turning element 110 may be located between a second optical lens 113 and a third optical lens 114 of the fixed optical assembly (here, second and third are counts along the direction of light entering), and a larger gap is provided between the second optical lens 113 and the third optical lens 114.

Further, in one example of the present application, in the periscopic optical zoom lens as a telephoto lens, the fixed optical assembly, the zoom optical assembly and the compensating optical assembly respectively have three, four and three optical lenses, and the fixed optical assembly further includes a light reflecting prism located between the second optical lens and the third optical lens. Light enters the fixed optical assembly, and is turned by the prism and then exits, and the fixed optical assembly has two orthogonal optical axes, i.e. an entering optical axis and an exiting optical axis. The entering light and exiting light of the fixed optical assembly are perpendicular to each other. The exiting optical axis of the fixed optical assembly is located on the same straight line as the optical axes of the zoom optical assembly and the compensating optical assembly, and these optical axes are merged together to constitute the main optical axis of the periscopic optical zoom lens.

In one example of the present application, the periscopic optical zoom lens is a telephoto lens, a focal length f thereof may be changed by moving the zoom optical assembly and the compensating optical assembly on the optical axis, and thus images of scenery at different distances may be acquired under the premise of clear shooting. For example, in the present example, the effective focal length of the telephoto lens may be increased by moving the zoom optical assembly and the compensating optical assembly near the fixed optical assembly at the same time (generally, the moving distances of the zoom optical assembly and the compensating optical assembly are different), whereas the effective focal length of the telehoto lens may be decreased by moving the zoom optical assembly and the compensating optical assembly away from the fixed optical assembly at the same time.

In one example of the present application, the telephoto lens may achieve continuous optical zoom with an effective focal length of the lens within the range of 18-30 mm. While the effective focal length of the telephoto lens changes as the zoom optical assembly moves, an aperture value (Fno) of the telephoto lens also changes as the effective focal length changes. For example, (effective focal length, Fno) may be (18 mm, 3.2), (21 mm, 3.9), (24 mm, 4.4), (27 mm, 4.9), and (30 mm, 5.3). Correspondingly, a field of view (FOV) also changes with the effective focal length, and (effective focal length, FOV) may be (18 mm, 16.5°), (21 mm, 13.8°), (24 mm, 12°), (27 mm, 10.7°), and (30 mm, 9.8°). Therefore, the telephoto lens described in the present application may achieve continuous optical zoom at a telephoto end. Further, in a preferred example, the telephoto lens may further achieve continuous optical zoom with an effective focal length within the range of 15-40 mm by optimizing the parameter design of the optical system.

Further, in one example of the present application, the telephoto lens further includes a diaphragm STOP (referring to FIG. 2) located at a front end of the zoom optical assembly. The diaphragm may be disposed or mounted on the zoom optical assembly so as to move together with the zoom optical lens group during optical zoom.

Further, in one example of the present application, in terms of optical design, the optical system of the telephoto lens further satisfies a series of conditions, and a better technical effect has been obtained. The meanings of symbols in each condition are listed below.

L: a total optical length of the periscopic optical zoom lens, i.e. a distance from an optical surface of an object side of the periscopic optical zoom lens to an image surface; HIMGH: a half image surface height; Z: a zoom magnification; LA: a length of the fixed optical assembly; LB: a length of the zoom optical assembly; LC: a length of the compensating optical assembly, fg1: a focal length of the fixed optical assembly; fg2: a focal length of the zoom optical assembly; fg3: a focal length of the compensating optical assembly; f: a focal length of the entire optical system; G1: a gap between the fixed optical assembly and the zoom optical assembly; G2: a gap between the zoom optical assembly and the compensating optical assembly; G3: a gap between the compensating optical assembly and a chip.

In the present example, the conditions to be satisfied by the optical system include the following conditions a to f.

Condition a: $10 \leq L/HIMGH \leq 15$. When condition a is satisfied, the length of an optical system of the present example (referred to as an optical system of a periscopic optical zoom lens) can be better controlled under the premise of a constant half image surface height.

Condition b: $15 \leq L/Z \leq 23$. When condition b is satisfied, the optical system of the present example can achieve a large zoom magnification at a small optical system length.

Condition c: $0.1 \leq LA/L \leq 0.5$; $0.1 \leq LB/L \leq 0.5$; and $0.1 \leq LC/L \leq 0.5$. Further, condition c may be replaced by a further optimized condition c1: $0.2 \leq LA/L \leq 0.4$; $0.1 \leq LB/L \leq 0.2$; $0.35 \leq LC/L \leq 0.5$.

Condition c and condition c1 each define the respective lengths of each group.

Condition d: $0.4 \leq fg1/f \leq 0.6$; $-0.3 \leq fg2/f \leq -0.1$; $-0.2 \leq fg3/f \leq -0.1$. Condition d defines the ratio of the focal length of each group to the focal length of the entire optical system. In some examples of the present application, the focal length of the fixed optical assembly is positive, the focal length of the zoom optical assembly is negative, the focal length of the compensating optical assembly is negative, and the three focal lengths comply with the definition of condition d. At this moment, the sum of moving strokes M1+M2 of the zoom optical assembly and the compensating optical assembly may be within a range of 4-6.5 mm. During zoom, the zoom optical assembly moves between the fixed optical assembly and the compensating optical assembly, thereby changing the focal length of the lens. When the zoom optical assembly moves along the optical axis, a distance difference between the zoom optical assembly and the fixed group at a maximum focal length and a minimum focal length of the lens is a moving amount of the zoom optical assembly, i.e. the moving stroke M1 of the zoom optical assembly (i.e. the moving stroke M1 of the zoom group). Specifically, the moving stroke M1 of the zoom group is: a difference between the distance from the zoom group to the fixed group in the state of a maximum focal length of the lens and the distance from the zoom group to the fixed group in the state of a minimum focal length of the lens. The compensating optical assembly moves between the zoom optical assembly and the imaging surface of the photosensitive chip so as to ensure clear imaging of the lens. A distance difference between the compensating optical assembly and the photosensitive assembly at the maximum focal distance and the minimum focal distance of the lens is a moving amount of the compensating optical assembly, i.e. the moving stroke M2 of the compensating optical assembly (i.e. the moving stroke M2 of the compensating group). Specifically, the moving stroke M2 of the compensating group is: a difference between the distance from the compensating group to the photosensitive chip in the state of a maximum focal length of the lens and the distance from the compensating group to the photosensitive chip in the state of a minimum focal length of the lens. In order to enable a small length size of the telephoto lens and not to greatly limit the zoom range of the telephoto lens to ensure a certain optical zoom capability, the sum of moving strokes M1+M2 of the zoom optical assembly and the compensating optical assembly in the present application is between 2 mm and 9 mm, and in some preferred examples, the value thereof (i.e. M1+M2) is between 4 mm and 6.5 mm. As the value of M1+M2 is smaller, the length of the telephoto lens is smaller. However, an undersized lens will affect the design of the zoom capability of the lens, making the zoom range of the lens smaller. And when condition d is satisfied, the sum of moving strokes M1+M2 of the zoom optical assembly and the compensating optical assembly may be within the range of 4-6.5 mm, so that the length of the periscopic optical zoom module can be effectively controlled, and the entire lens can have an excellent optical zoom capability. Table 1 shows values of M1 and M2 in six different examples.

TABLE 1

| Example | M1 (mm) | M2 (mm) | M1 + M2 (mm) |
|---|---|---|---|
| 1 | 0.594 | 4.689 | 5.283 |
| 2 | 0.635 | 4.508 | 5.143 |
| 3 | 0.680 | 4.701 | 5.381 |
| 4 | 0.566 | 5.656 | 6.222 |
| 5 | 0.599 | 4.432 | 5.031 |
| 6 | 2.169 | 2.358 | 4.527 |

In the six examples of Table 1, the fixed group, the zoom group and the compensating group of Examples 1-5 have 3, 4, and 3 optical lenses, respectively, and the moving directions of the zoom group and the compensating group are the same during zoom (e.g. the zoom group and the compensating group both move in a positive x-axis direction or both move in a negative x-axis direction at a single zoom movement). The fixed group, the zoom group and the compensating group of Example 6 have 2, 5, and 3 optical lenses, respectively, and the moving directions of the zoom group and the compensating group are opposite during zoom (e.g. the zoom group and the compensating group respectively move in positive and negative x-axis directions at a single zoom movement).

Condition e: $0 \leq G1/G2 \leq 1.2$; $0 \leq G2/G3 \leq 8$. Condition e defines the relationship of gaps between groups during the optical zoom of the optical system of the present example.

Condition f: $0.02 \leq G3/L \leq 0.20$. A back focal length (G3) changes with the zoom of the optical system. When condition f is satisfied, the back focal length of the optical system of the present example can be smaller with respect to the total optical length. Specifically, it is possible to realize that the back focal length changes from 0.8 to 6.7 mm, and the reduction of the back focal length of the optical system makes it possible to reduce the size of the telephoto lens of the present example.

Further, in another example of the present application, in the periscopic optical zoom lens as a telephoto lens, the fixed optical assembly, the zoom optical assembly and the compensating optical assembly respectively have two, five and three optical lenses, and two fixed lenses of the fixed optical assembly are both disposed on the light entering side of the reflecting prism. Since the two fixed lenses both are disposed on the light entering side of the reflecting prism in the present example, it is not necessary to simultaneously calibrate the position and attitude of the optical lens on the light entering side and the light exiting side when assembling the fixed optical assembly, and therefore the difficulty in assembling the fixed optical assembly can be reduced. It should be noted that in the telephoto lens, the optical sensitivity of the first three optical lenses near an object side tends to be large. In the present example, the third optical lens from the object side is disposed on the zoom optical assembly. The zoom optical assembly of the present example has a greater optical sensitivity than the foregoing example (referring to the example in which the fixed optical assembly, the zoom optical assembly and the compensating optical assembly are respectively provided with three, four and three optical lenses). During zoom, deviations in the position and attitude of the zoom optical assembly may have a relatively large influence on the imaging quality. Therefore, in the present example, it is possible to obtain a high imaging quality by providing an anti-shake function at the photosensitive assembly and/or compensating for positional and attitude deviations of the zoom optical assembly at different zoom magnifications by a software algorithm. Furthermore, in the present example, a diaphragm may be disposed between the third lens and the fourth lens on the object side of the optical system. That is, the diaphragm may be disposed between the first lens and the second lens of the object side in the zoom optical assembly.

Further, in one example of the present application, there is also provided a telephoto lens capable of continuous optical zoom based on a periscopic design that allows for structural stability. On the one hand, in order to achieve a large range of optical zoom, adjacent lens groups in the telephoto lens may be within a short distance, while on the other hand, various lens groups often need to be assembled by a structural member in the present example. The structural member usually provides a function of protecting an optical member (e.g. each lens). Generally, an optical design is performed in an actual production process, and then a corresponding structural member is designed to assemble an actual product according to the determined optical design. In the present disclosure, in order to reduce the length of the module as much as possible (where the length of the module refers to the size in the direction of the main optical axis of the periscopic module), it may be preferable in the optical design to design the optical surface distance between various lens groups as small as possible. On the other hand, however, this design concept may cause the structural members (e.g. lens barrels) of the optical assemblies to interfere with each other. To balance both, at least one of two adjacent optical surfaces belonging to two adjacent lens groups is a convex surface in the present example. That is, two adjacent optical surfaces respectively belonging to two adjacent lens groups may both be convex surfaces; or, one of two adjacent optical surfaces respectively belonging to two adjacent lens groups is a convex surface and the other is a concave surface. Such a design may help to leave a sufficient gap for the design of a structural member to avoid that the structural stability and reliability of the optical system are reduced due to insufficiency in the thickness of the structural member. Specifically, the lens groups may include a fixed lens group, a zoom lens group and a compensating lens group. The fixed lens group may be mounted in a fixed assembly housing (i.e. a structural member of the fixed lens group), the zoom lens group may be mounted in a zoom lens barrel (i.e. a structural member of the zoom lens group), and the compensating lens group may be mounted in a compensating lens barrel (i.e. a structural member of the compensating lens group). An image side surface of an optical lens nearest an image side of the fixed lens group and an object side surface of an optical lens nearest an object side of the zoom group include at least one convex surface, and an image side surface of an optical lens nearest an image side of the zoom lens group and an object side surface of an optical lens nearest an object side of the compensating lens group also include at least one convex surface.

Furthermore, in one example of the present application, the distance between the fixed assembly housing and the zoom lens barrel is minimum when the effective focal length of the entire telephoto lens is maximum under the condition that the movement of each optical assembly of the telephoto lens can satisfy a wide range of optical zoom, and the minimum distance may preferably be 0.002-0.2 mm during the structural design. When the distance is less than 0.002 mm, since the precision of lens barrel manufacturing is difficult to meet this requirement, the production yield of the lens barrel may be greatly reduced, and when the distance is greater than 0.2 mm, the thickness of the top of the lens barrel for bearing against the lens (sometimes referred to as a roof surface) may be excessively small, thereby reducing the reliability of the zoom lens barrel (multiple lenses often need to be assembled inside the zoom lens barrel so that the roof surface of the lens barrel is required to have a certain structural strength to ensure the reliability of lens group assembly). Similarly, when the distance between the zoom lens barrel and the compensating lens barrel is minimum (when the effective focal length of the lens is maximum in the present example), this minimum distance may preferably be 0.002-0.2 mm. When the distance is less than 0.002 mm, since the precision of lens barrel manufacturing is difficult to meet this requirement, the yield of the lens is greatly reduced, and when the distance is greater than 0.2 mm, the thickness of a top surface of the compensating lens barrel (sometimes referred to as a roof surface) is reduced, thereby reducing the reliability of the compensating lens barrel (multiple lenses often need to be assembled inside the compensating lens barrel and the distance between some lenses may be large so that the roof surface of the lens barrel is required to have a certain structural strength to ensure the reliability of lens group assembly).

In one example of the present application, the effective focal length of the telephoto lens is larger. In order to obtain sufficient luminous flux and ensure sufficient light imaging, while the total optical length of the telephoto lens is larger than that of an ordinary lens, the size of the optical lens of the telephoto lens is relatively large. In order to reduce the height of the periscopic telephoto lens, at least one optical lens of the zoom optical assembly and the compensating optical assembly may be trimmed. The trimming may be accomplished by cutting, grinding, etching, or molding directly. The trimming may be: trimming an optically ineffective area (i.e. a structural area) of the optical lens, and sometimes trimming an optical area of the optical lens. A corresponding lens barrel for receiving the trimmed lens may also be correspondingly trimmed. Therefore, the shape of part or all of the zoom lens and the compensating lens may be a cut circle. The cut circle is a shape formed by cutting the top or/and bottom of a circle.

Figure 5:
FIG. 5 shows a schematic stereogram of a trimmed optical lens in one example of the present application.

Further, in one example of the present application, the zoom lens barrel and the compensating lens barrel have at least one further planar outer side surface. Two opposite sides of the optical lens (after being disposed in the periscopic lens, the two opposite sides here are a top side and a bottom side) are trimmed, and outer side surfaces of two opposite sides of the zoom lens barrel and the compensating lens barrel are planar (after being disposed in the periscopic lens, the outer side surfaces of the two opposite sides here are a top side and a bottom side, respectively). FIG. 5 shows a schematic stereogram of a trimmed optical lens in one example of the present application. In the present example, both sides of the lens barrel are planar, so that the height of the periscopic module can be reduced as much as possible, thereby helping to reduce the thickness of an electronic device (e.g. a mobile phone or a tablet computer) on which the periscopic module is to be mounted. Moreover, two opposite planar outer side surfaces of the zoom lens barrel and the compensating lens barrel may provide a relatively flat mounting surface, so that the telephoto lens can be more easily mounted into a driving mechanism (e.g. a bearer of the driving mechanism) of a camera module.

Furthermore, in some examples of the present application, there are also provided some periscopic continuous optical zoom modules. The periscopic continuous optical zoom module may include a photosensitive assembly and the periscopic continuous optical zoom lens in any of the above examples. The photosensitive assembly may include a filter assembly, a photosensitive chip and a circuit board. The filter assembly may include a lens base and a filter mounted on the lens base. A top surface of the lens base may be a flat mounting surface, and the periscopic continuous optical zoom lens may be mounted on the mounting surface so as to assemble a periscopic continuous optical zoom module. It should be noted that in the present application, the photosensitive assembly is not limited to the above implementation, as long as it is suitable for assembly with the above periscopic continuous optical zoom lens.

Furthermore, according to one example of the present application, there is provided a periscopic optical zoom lens having ten lenses in an optical design. Specifically, the ten lenses sequentially include from an object side to an image side:

a first lens having a positive focal power, an object side surface thereof being a convex surface and an image side surface thereof being a convex surface;

a second lens having a negative focal power, an object side surface thereof being a concave surface and an image side surface thereof being a concave surface;

a third lens having a positive focal power, a paraxial part of an object side surface thereof being a convex surface and an image side surface thereof being a convex surface;

a fourth lens having a negative focal power, an object side surface thereof being a concave surface and an image side surface thereof being a concave surface;

a fifth lens having a positive focal power, an object side surface thereof being a convex/concave surface and an image side surface thereof being a convex surface;

a sixth lens having a negative focal power, an object side surface thereof being a concave surface and an image side surface thereof being a convex/concave surface;

a seventh lens having a negative focal power, an object side surface thereof being a convex/concave surface and an image side surface thereof being a concave surface;

an eighth lens having a positive focal power, an object side surface thereof being a convex surface and an image side surface thereof being a convex surface;

a ninth lens having a negative focal power, an object side surface thereof being a concave surface and a paraxial part of an image side surface thereof being a convex/concave surface; and a tenth lens having a negative focal power, a paraxial part of an object side surface thereof being a convex/concave surface and a paraxial part of an image side surface thereof being a convex/concave surface.

The periscopic optical zoom lens further includes a reflecting prism, and the reflecting prism may be disposed at a front end of the first lens or between any two of the ten lenses in terms of the optical design.

The reflecting prism can be disposed in front of a first lens or between any two lenses. The optical design also satisfies the following conditions.

Condition 1: a total optical length TTL of the optical system and a half imaging height HImgH satisfy: $10 \leq TTL/HImgH \leq 15$. When condition 1 is satisfied, it can be ensured that the system has a more compact structure while compressing the height of the periscopic optical zoom lens. Here, the height refers to a size in a direction parallel to the optical axis of the light entering side of the reflecting prism.

Condition 2: an effective focal length f of the optical system and the half imaging height HIMGH satisfy: $6 \leq f/HImgH \leq 12$. When condition 2 is satisfied, it can be ensured that the optical system of the periscopic optical zoom lens has a suitable field of view.

Condition 3: the relationship between the total optical length TTL of the optical system and a zoom magnification Z satisfies: $15 \leq TTL/Z \leq 23$. When condition 3 is satisfied, it can be ensured that the total optical length of the system is not too large.

Condition 4: the relationship between a first group length LA (i.e. a fixed group length), a second group length LB (i.e. a zoom group length) and a third group length LC (i.e. a compensating group length) of the optical system and the total optical length TTL of the system satisfies: $0.1 \leq LA/L \leq 0.5$, $0.1 \leq LB/L \leq 0.5$, and $0.1 \leq LC/L \leq 0.5$. When condition 4 is satisfied, it can be ensured that the distribution of various group lengths is uniform and the motor stroke is uniform.

Condition 5: a focal length fg1 of a first group, a focal length fg2 of a second group and a focal length fg3 of a third group of the system satisfy: $0.4 \leq fg1/f \leq 0.6$, $-0.3 \leq fg2/f \leq -0.1$, and $-0.3 \leq fg3/f \leq -0.1$. When condition 5 is satisfied, the system aberration can be corrected, so that the required imaging quality can be achieved under different zoom magnifications.

Condition 6: at all zoom magnifications (zoom multiples) during zoom, a gap G1 between the first group and the second group, a gap G2 between the second group and the third group, and a gap G3 between the third group and the photosensitive chip of the system satisfy: $0 \leq G1/G2 \leq 1.2$ and $0 \leq G2/G3 \leq 8$. When condition 6 is satisfied, the total optical length of the system can be controlled while ensuring the zoom magnification of the system.

Condition 7: refractive indexes of the first lens, the second lens, the third lens, the fourth lens, the fifth lens, the sixth lens, the seventh lens, the eighth lens, the ninth lens, and the tenth lens of the optical system are respectively n1, n2, n3, n4, n5, n6, n7, n8, n9, and n10, Abbe numbers are respectively v1, v2, v3, v4, v5, v6, v7, v8, v9, and v10, an average value of dispersion coefficients of a positive focal power lens is np, an average value of dispersion coefficients of a negative focal power lens is nn, an average value of Abbe numbers of the positive focal power lens is Vdp, an average value of Abbe numbers of the negative focal power lens is Vdn, and the above parameters satisfy:

$0 \leq (v1+v2+v3)/(v4+v5+v6+v7) \leq 1$ $1 \leq (v4+v5+v6+v7)/(v8+v9+v10) \leq 1.5$ $0 \leq (n1+n2+n3)/(n4+n5+n6+n7) \leq 1$ $1 \leq (n4+n5+n6+n7)/(n8+n9+n10) \leq 1.5$ $35 \leq Vdn \leq 50$ $40 \leq Vdp \leq 50$ $1.55 \leq nn \leq 1.60$ $1.50 \leq np \leq 1.60$.

When the above relational expression is satisfied (i.e. condition 7 is satisfied), dispersion can be effectively reduced, and aberration can be corrected.

Condition 8: if an optical path length of the optical system in front of the reflecting prism is Lpf and a prism width is D, then: $0 \leq Lpf+D \leq 8$. When condition 8 is satisfied, the height of the periscopic optical zoom lens can be controlled. Here, the height refers to a size in a direction parallel to the optical axis of the light entering side of the reflecting prism.

2. Structural Design

Figure 6:
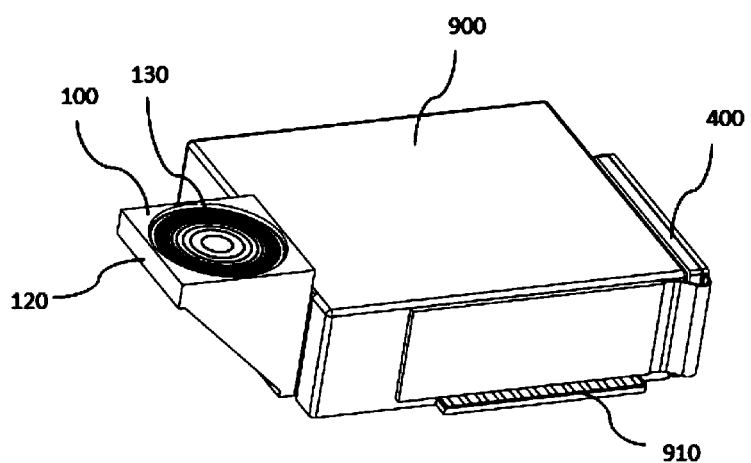
FIG. 6 shows a schematic appearance stereogram of a periscopic optical zoom module in one example of the present application.

FIG. 6 shows a schematic appearance stereogram of a periscopic optical zoom module in one example of the present application. Referring to FIG. 6, in the present example, the periscopic optical zoom module includes a fixed optical assembly 100, an adjustable optical assembly 900 and a photosensitive assembly 400. The fixed optical assembly 100 includes a reflecting prism (the reflecting prism is blocked in FIG. 6), a fixed lens 130 and a fixed assembly housing 120. There may be one or more fixed lenses 130. At least one of the fixed lens 130 is located at a front end of a light entering surface of the reflecting prism. The reflecting prism and the fixed lens 130 are both mounted in the fixed assembly housing 120. The fixed assembly housing 120 has a light entering hole on a light entering side of the fixed optical assembly and a light exiting hole on a light exiting side of the fixed optical assembly. The adjustable optical assembly includes a zoom optical assembly, a compensating optical assembly, a driving mechanism, and an adjustable assembly housing. The driving mechanism is adapted to drive the zoom optical assembly and the compensating optical assembly to respectively move relative to the fixed optical assembly (relative to the photosensitive assembly). The zoom optical assembly, the compensating optical assembly and the driving mechanism may all be disposed in the adjustable assembly housing. The photosensitive assembly includes a photosensitive chip. The photosensitive assembly is located on an image side of the periscopic optical zoom module and configured to receive light passing through the fixed optical assembly, the zoom optical assembly and the compensating optical assembly so as to complete imaging. The adjustable assembly housing may have a light entering hole and a light exiting hole, and the photosensitive assembly may be fixed directly at the light exiting hole of the adjustable assembly housing. In the present example, the periscopic optical zoom module may be a telephoto camera module for satisfying a telephoto requirement. In the present example, a light turning element may be disposed between two fixed lenses such that a TTL/module length is greater than 0.8. Here, TTL is a total optical length of the periscopic optical zoom module. In the present example, the total optical length refers to the distance from a first optical surface on an object side of an optical system to a photosensitive surface (or image surface). The module length is a total length of the periscopic optical zoom module in the direction of the main optical axis thereof. This design may have a larger TTL under the premise of a smaller module length. Furthermore, in a preferred example, the TTL/module length may be greater than 0.9 so that the size of the telephoto camera module may be further reduced to meet camera requirements. Further, the light entering side of the reflecting prism of the fixed optical assembly has at least one optical lens. In order to avoid oversizing in the height direction of the module and thus difficult to fit into a thinner mobile phone, the top surface of the adjustable optical assembly is lower than the top surface of the light entering side of the fixed lens barrel of the fixed optical assembly. That is, the fixed lens barrel portion of the fixed optical assembly may protrude from the adjustable optical assembly. In the present example, the height of the adjustable optical assembly is less than 8 mm and the height of the periscopic camera module may be less than 10 mm. Specifically, in one example, the height of the adjustable optical assembly may be about 6.65 mm and the height of the periscopic optical zoom module may be about 8.5 mm.

Figure 7:
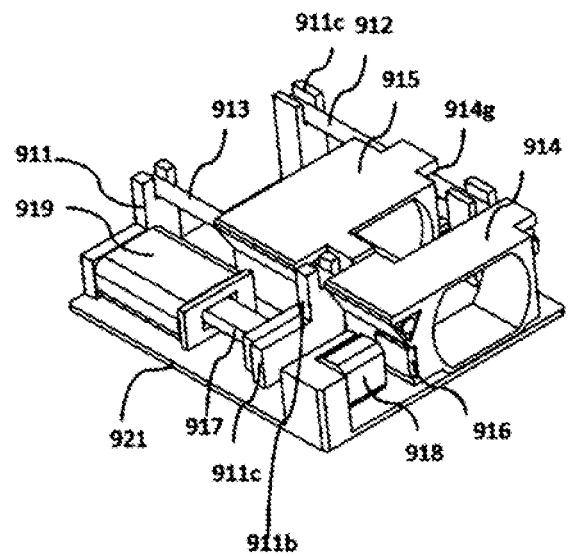
FIG. 7 shows a schematic stereogram of a driving mechanism of an adjustable optical assembly in one example of the present application.
Figure 8:
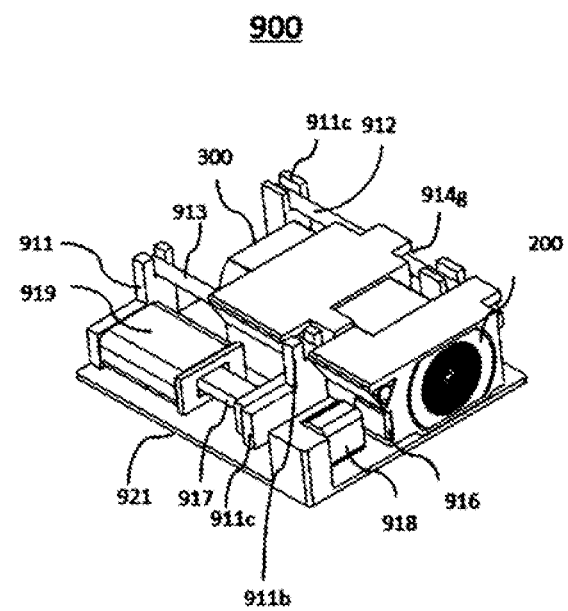
FIG. 8 shows a schematic stereogram of an internal structure of an adjustable optical assembly in one example of the present application.

Further, FIG. 7 shows a schematic stereogram of a driving mechanism of an adjustable optical assembly in one example of the present application. FIG. 8 shows a schematic stereogram of an internal structure of an adjustable optical assembly in one example of the present application. Referring to FIGS. 7 and 8 in combination, in the present example, the adjustable optical assembly 900 includes a zoom optical assembly 200, a compensating optical assembly 300, a driving mechanism 910, and an adjustable assembly housing 920. The adjustable assembly housing 920 includes a bearing base 921, and the bearing base 921 is generally flat. The driving mechanism 910 may be mounted on an upper surface of the bearing base 921. The driving mechanism 910 may include multiple brackets 911, a first guide rod 912 and a second guide rod 913 supported at top ends of the multiple brackets 911, a zoom bearer 914 and a compensating bearer 915 mounted on the first guide rod 912 and the second guide rod 913, a first magnet 916 mounted on the zoom bearer 914, a second magnet 917 connected to the compensating bearer 915, and a first coil 918 and a second coil 919 mounted on the bearing base 921. The zoom bearer 914 is slidable along the first guide rod 912 and the second guide rod 913 by the first magnet 916 and the first coil 918, and the compensating bearer 915 is slidable along the first guide rod 912 and the second guide rod 913 by the second magnet 917 and the second coil 919. The top ends of the brackets 911 have grooves for supporting the first guide rod 912 and the second guide rod 913. The bottom ends of the brackets 911 are connected to the upper surface of the bearing base 921. The brackets 911 and the base 921 may be integrally formed, or the brackets 911 and the base 921 may be separately prefabricated and then assembled together. The zoom bearer 914 has a through hole for mounting the zoom optical assembly 200, and the compensating bearer 915 has a through hole for mounting the compensating optical assembly 300. In the present example, the first magnet 916 and the second magnet 917 are both magnets made of a permanent magnetic material.

Further, still referring to FIGS. 7 and 8, in one example of the present application, the zoom optical assembly 200 may be a zoom sub-lens including a first lens barrel and a zoom lens group mounted in the first lens barrel. The compensating optical assembly 300 may be a compensating sub-lens including a second lens barrel and a compensating lens group mounted in the second lens barrel. An outer side surface of the first lens barrel is adapted to the shape of an inner side surface (i.e. a wall of the through hole) of the zoom bearer 914. The first lens barrel may be bonded to the inner side surface of the zoom bearer 914 (in another example, the first lens barrel may also be in threaded connection with the inner side surface of the zoom bearer). An outer side surface of the second lens barrel is adapted to the shape of an inner side surface of the compensating bearer 915. The second lens barrel may be bonded to the inner side surface of the compensating bearer 915 (in another example, the second lens barrel may also be in threaded connection with the inner side surface of the compensating bearer). In the present example, the first guide rod 912 and the second guide rod 913 are parallel (an arrangement direction of the first guide rod and the second guide rod coincides with the direction of optical axes of the zoom sub-lens and the compensating sub-lens), and the first guide rod 912 and the second guide rod 913 are respectively arranged at two side areas of the through holes of the zoom bearer and the compensating bearer. In the present example, the first coil 918, the second coil 919, the first magnet, and the second magnet are arranged on the same side of the optical assembly, and for convenience of description, the side on which the first coil, the second coil, the first magnet, and the second magnet are arranged is referred to herein as a driving side. In the present example, the first guide rod 912 is located on the opposite side of the driving side, and the second guide rod 913 is located on the driving side. The brackets 911 may include a first bracket for supporting the first guide rod 912 and a second bracket for supporting the second guide rod 913. The first bracket may be columnar, and a groove 911*a* is disposed at the top of the first bracket to support the first guide rod 912. The second bracket may include a columnar supporting portion 911*b* and a baffle plate 911*c*. The baffle plate 911*c* is formed by extending outwards (i.e. toward the driving side) from the columnar supporting portion 911*b*. The baffle plate 911*c* may separate the respective moving ranges of the zoom sub-lens and the compensating sub-lens. There may be two first brackets and two second brackets. In other examples, the number of brackets 911 may definitely be flexible depending on the situation. For example, one first bracket and one second bracket may be disposed on the bearing base, or three or more first brackets and three or more second brackets may be disposed. The number of first brackets and second brackets may also be non-uniform. For example, in another example, two first brackets and three second brackets may be disposed on the bearing base. The top grooves of both of the first bracket and the second bracket are open upwards. The top grooves 911*c* of all of the first brackets are located substantially in the same straight line so that the first guide rod 912 mounted in the grooves is in a state parallel to the optical axis. The top grooves of all of the second brackets are located substantially in the same straight line so that the second guide rod 913 mounted in the grooves is in a state parallel to the optical axis.

Further, still referring to FIGS. 7 and 8, in one example of the present application, the second bracket may serve as an element for limiting the moving strokes of the zoom bearer 914 and the compensating bearer 915, in addition to mounting the second guide rod 913. The second bracket may include a columnar supporting portion 911*b* and a baffle plate 911*c*. The baffle plate 911*c* is formed by extending outwards from the columnar supporting portion 911*b*. One second bracket is located between the zoom bearer 914 and the compensating bearer 915, which can prevent the zoom optical assembly 200 and the compensating optical assembly 300 mounted in the zoom bearer 914 and the compensating bearer 915 from colliding and causing damage. And another second bracket may be located near the image side of the compensating bearer 915, and the second bracket may prevent the compensating bearer 915 from moving out of the stroke.

Figure 9:
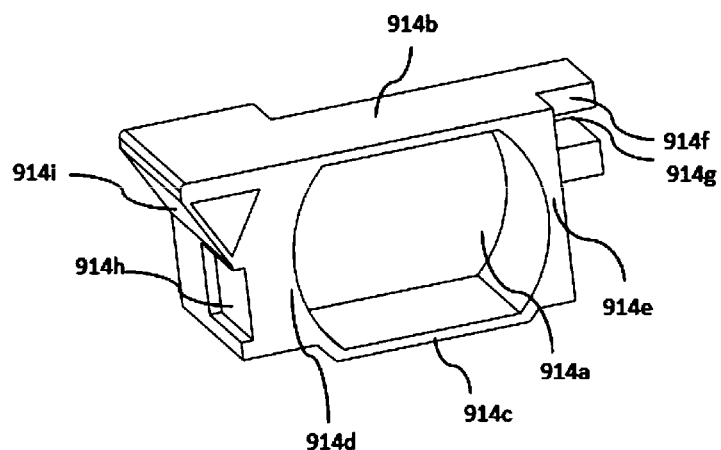
FIG. 9 shows a schematic stereogram of a zoom bearer in one example of the present application.
Figure 10:
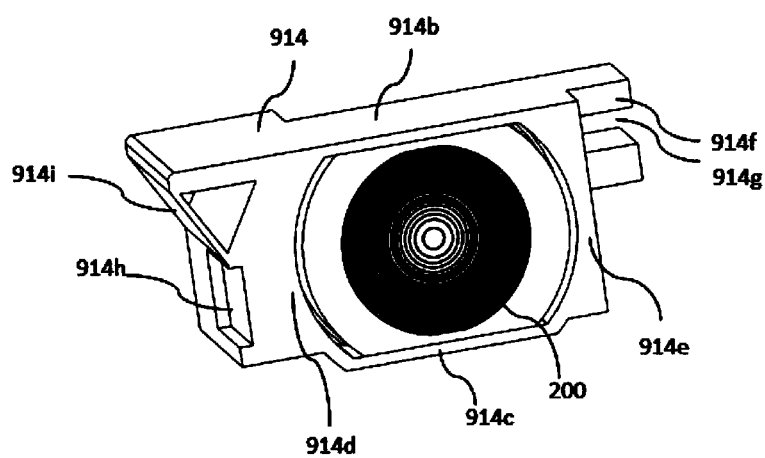
FIG. 10 shows a schematic stereogram of a zoom bearer assembled with a zoom optical assembly in one example of the present application.

Further, FIG. 9 shows a schematic stereogram of a zoom bearer in one example of the present application. FIG. 10 shows a schematic stereogram of a zoom bearer assembled with a zoom optical assembly in one example of the present application. Referring to FIGS. 9 and 10, in the present example, the zoom bearer 914 has a through hole for mounting the zoom optical assembly 200 so that the zoom driving assembly may move the zoom optical assembly 200 along the optical axis by driving the zoom bearer 914 to move. For convenience of description, the through hole for mounting the zoom optical assembly 200 may be referred to as a zoom through hole 914a. The zoom optical assembly 200 and the zoom bearer 914 may be bonded by an adhesive or may be fixed by threads. The zoom through hole may be in a shape of a cut circle. Specifically, the cut circle is formed by cutting the top and bottom of a circle, as shown in FIGS. 9 and 10. Such a through hole in the shape of the cut circle helps to reduce the height of the zoom bearer 914, thereby achieving miniaturization of devices and reducing the thickness of terminal devices such as mobile phones. Further, in the present example, the zoom bearer 914 has two end surfaces and four side surfaces. The two end surfaces are a front end surface near an object space and a rear end surface near an image space, respectively. The four side surfaces are a top side 914b, a bottom side 914c, a driving side 914d, and a driven side 914e, respectively. The driving side 914d is the side near an electromagnetic driving element, and the driven side 914e is the side facing away from the electromagnetic driving element. The top side 914b and the bottom side 914c of the zoom bearer 914 have top and bottom side walls, respectively, which may have a smaller thickness to reduce the height of the periscopic zoom module. The specific thickness values may be determined on a practical basis, as long as the top and bottom side walls are structurally strong enough to reliably fix the zoom optical assembly mounted therein. The driven side 914e of the zoom bearer 914 has a driven side wall that may be thicker than the top and bottom side walls. A top area of the driven side wall extends laterally outwards to form a lateral extension portion 914f, the lateral extension portion 914f forms a lateral guide rod slot 914g, and an opening direction thereof faces away from the driving side. And the opening direction of the lateral guide rod slot 914g is substantially perpendicular to an opening direction of the top groove 911c of the first bracket (the top groove 911c of the first bracket is open upwards, and the lateral guide rod slot 914g is open laterally outwards), so that the zoom bearer may be more stably mounted on the first bracket through the first guide rod 912. In the zoom bearer, the zoom through hole 914a may be considered to be composed of the top side wall, the bottom side wall, the driven side wall, and the driving side wall. The driving side wall is located on the driving side of the zoom bearer. The driving side wall extends laterally outwards and may form a driving extension portion having an electromagnetic element mounting structure 914h and a guide rod mounting structure 914i. The height of the driving extension portion does not exceed the height of the top side wall, thereby avoiding an additional occupation of the size in the thickness direction of a mobile phone (or other terminal devices). In the present example, the entire zoom bearer 914 may be integrally formed. Therefore, the driving side wall and the driving extension portion may be integrated. In this way, the wall thickness of the zoom through hole on the driving side can be significantly larger than the thickness of the driven side wall, the top side wall and the bottom side wall. In the present example, the guide mounting structure 914i of the driving extension portion may include a through hole having a triangular cross-section, which may be referred to as a guide rod through hole (or referred to as a guide rod tube) for convenience of description. The second guide rod may pass through the guide rod through hole. Specifically, the cross-section of the guide rod through hole may be in a shape of a rounded triangle. The rounded triangle may be a triangle with a vertex at which a rounded corner (or chamfer) is provided. A ball may be disposed between the guide rod through hole and the second guide rod passing through. The ball may be disposed on at least three sides of the second guide rod (the three sides here may be positions corresponding to three rounded corners of the rounded triangle), and a lubricating medium may be further provided in the guide rod through hole so as to reduce friction between the second guide rod, the ball, and a hole wall of the guide rod through hole. Preferably, the cross-section of the guide rod through hole is a rounded equilateral triangle. To enable a zoom magnetic element (e.g. first magnet 916) to be steadily mounted on the zoom bearer 914, the zoom bearer 914 may have an electromagnetic element mounting structure 914h thereon. The electromagnetic element mounting structure 914h may be groove-like, and the zoom magnetic element can be embedded fixedly into the groove-like structure, thereby being fixed to the zoom bearer 914.

Further, referring to FIGS. 7, 9 and 10 in combination, in one example of the present application, the zoom bearer 914 and the zoom optical assembly 200 carried thereby may be driven by a zoom driving assembly. The zoom driving assembly may include a zoom coil (i.e. first coil 918) and a zoom magnetic element (i.e. first magnet 916). The zoom magnetic element is fixed on the driving side 914d of the zoom bearer, the zoom coil may be fixed on the bearing base 921, and the zoom coil is opposite to the zoom magnetic element. Specifically, the zoom magnetic element is substantially plate-like, and may have a surface facing the driving element. The surface faces the zoom coil. By energizing the zoom coil, the zoom magnetic element may be moved relative to the bearing base, thereby driving the zoom bearer to move relative to the bearing base to achieve optical zoom of the camera module. It should be noted that in other examples of the present application, the positions of the zoom coil and the zoom magnetic element may be interchanged, i.e. the zoom coil may be fixed to the zoom bearer and the zoom magnetic element may be fixed to the bearing base.

Figure 11:
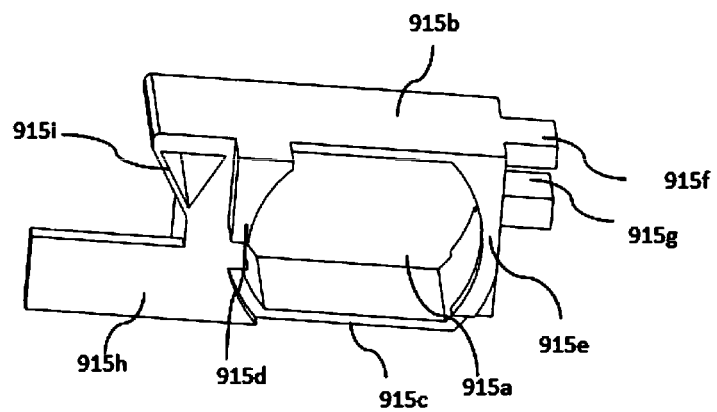
FIG. 11 shows a schematic stereogram of a compensating bearer in one example of the present application.
Figure 12:
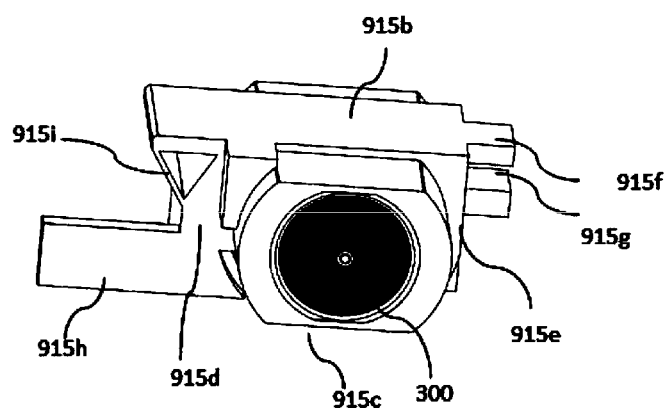
FIG. 12 shows a schematic stereogram of a compensating bearer assembled with a compensating optical assembly in one example of the present application.

Further, FIG. 11 shows a schematic stereogram of a compensating bearer in one example of the present application. FIG. 12 shows a schematic stereogram of a compensating bearer assembled with a compensating optical assembly in one example of the present application. Referring to FIGS. 11 and 12, in the present example, the compensating bearer 915 has a through hole for mounting the compensating optical assembly 300 so that the compensating driving assembly may move the compensating optical assembly 300 along the optical axis by driving the compensating bearer 915 to move. For convenience of description, the through hole for mounting the compensating optical assembly 300 may be referred to as a compensating through hole 915a. The compensating optical assembly 300 and the compensating bearer 915 may be bonded by an adhesive or may be fixed by threads. The compensating through hole 915a may be in a shape of a cut circle. Specifically, the cut circle is formed by cutting the top and bottom of a circle, as shown in FIGS. 11 and 12. Such a through hole in the shape of the cut circle helps to reduce the height of the compensating bearer 915, thereby achieving miniaturization of devices and reducing the thickness of terminal devices such as mobile phones. Further, in the present example, the compensating bearer 915 has two end surfaces and four side surfaces. The two end surfaces are a front end surface near an object space and a rear end surface near an image space, respectively. The four side surfaces are a top side 915b, a bottom side 915c, a driving side 915d, and a driven side 915e, respectively. The driving side 915d is the side near an electromagnetic driving element, and the driven side 915e is the side facing away from the electromagnetic driving element. The top side 915b and the bottom side 915c of the compensating bearer 915 have top and bottom side walls, respectively, which may have a smaller thickness to reduce the height of the periscopic compensating module. The specific thickness values may be determined on a practical basis, as long as the top and bottom side walls are structurally strong enough to reliably fix the compensating optical assembly mounted therein. The driven side 915e of the compensating bearer 915 has a driven side wall that may be thicker than the top and bottom side walls. A top area of the driven side wall extends laterally outwards to form a lateral extension portion 915f, the lateral extension portion 915f forms a lateral guide rod slot 915g, and an opening direction thereof faces away from the driving side. And the opening direction of the lateral guide rod slot is substantially perpendicular to an opening direction of the top groove of the first bracket (the top groove of the first bracket is open upwards, and the lateral guide rod slot is open laterally outwards), so that the compensating bearer may be more stably mounted on the first bracket through the first guide rod. In the compensating bearer, the compensating through hole may be considered to be composed of the top side wall, the bottom side wall, the driven side wall, and the driving side wall. The driving side wall is located on the driving side 915d of the compensating bearer 915. The driving side wall extends laterally outwards and may form a driving extension portion having an electromagnetic element mounting structure 915h and a guide rod mounting structure 915i. The height of the driving extension portion does not exceed the height of the top side wall, thereby avoiding an additional occupation of the size in the thickness direction of a mobile phone (or other terminal devices). In the present example, the entire compensating bearer 915 may be integrally formed. Therefore, the driving side wall and the driving extension portion may be integrated. In this way, the wall thickness of the compensating through hole 915 on the driving side 915d can be significantly larger than the thickness of the driven side wall, the top side wall and the bottom side wall. In the present example, the guide mounting structure 915i of the driving extension portion is a through hole having a triangular cross-section, which may be referred to as a guide rod through hole (or referred to as a guide rod tube) for convenience of description. The second guide rod may pass through the guide rod through hole. Specifically, the cross-section of the guide rod through hole may be in a shape of a rounded triangle. The rounded triangle may be a triangle with a vertex at which a rounded corner (or chamfer) is provided. A ball may be disposed between the guide rod through hole and the second guide rod passing through. The ball may be disposed on at least three sides of the second guide rod (the three sides here may be positions corresponding to three rounded corners of the rounded triangle), and a lubricating medium may be further provided in the guide rod through hole so as to reduce friction between the second guide rod, the ball, and a hole wall of the guide rod through hole. Preferably, the cross-section of the guide rod through hole is a rounded equilateral triangle. The compensating driving assembly may include a compensating coil (i.e. second coil 919) and a compensating magnetic element (second magnet 917). To enable the compensating magnetic element (i.e. second magnet 917) to be steadily mounted on the compensating bearer 915, the compensating bearer 915 may have a magnetic element mounting structure 915h thereon. The magnetic element mounting structure 915h may be formed by extending outwards across the underneath of the second guide rod (the second guide rod is not shown in FIGS. 11 and 12, and reference may be made to FIG. 7). The compensating magnetic element may be a bar magnet having an end connected to the magnetic element mounting structure and a free end. The axis of the bar magnet coincides with the direction of the optical axis of the compensating optical assembly 300. The bar magnet may extend into the compensating coil. This design allows the compensating driving assembly to have a greater driving force. In the present example, the compensating optical assembly has an axial length larger than that of the zoom optical assembly, and thus has a relatively large weight. The compensating driving assembly may provide a larger driving force for the compensating bearer and the compensating optical assembly in a limited space by adopting the above structure. And the stroke of the compensating driving assembly may be increased by extending the magnetic element partially into the through hole of the coil with respect to the arrangement manner in which the magnetic element is disposed outside the coil. In the present example, by energizing the compensating coil, the compensating magnetic element may be moved relative to the bearing base, thereby driving the compensating optical assembly bearer to move relative to the bearing base, so that the compensating function in the optical zoom of the camera module can be realized. When the zoom optical assembly is moved to change the focal length of the optical system, the image surface of the optical system will also move. However, in the camera module, the position of the photosensitive assembly is fixed. Therefore, by moving the compensating optical assembly, the image surface of the optical system and the imaging surface of the photosensitive chip of the photosensitive assembly are overlapped as much as possible, so as to realize the imaging of the camera module. The compensating function of the compensating optical assembly is mainly to adjust the image surface of the optical system to implement clear imaging. Therefore, the movement of the compensating optical assembly may also be regarded as a focusing process.

In the above examples, the first guide rod and the second guide rod can ensure that the zoom optical assembly and the compensating optical assembly do not easily incline at the time of moving, and the continuous optical zoom of a telephoto lens (the periscopic optical zoom lens in the present application is the telephoto lens) can be achieved by a driving manner of coil-magnetic element, i.e. a driving manner of a voice coil motor (VCM).

It should be noted that in the above examples, the positions of the zoom coil and the zoom magnetic element may be interchanged, i.e. the zoom coil may be fixed to the zoom bearer and the zoom magnetic element may be fixed to the bearing base. Similarly, the positions of the compensating coil and the compensating magnetic element may be interchanged.

In the above examples, the positions of the lateral guide rod slot and the guide rod through hole (i.e. guide rod tube) on the zoom bearer may be interchanged, or both sides of the zoom bearer may be provided with the guide rod through hole or the lateral guide rod slot. Similarly, the positions of the lateral guide rod slot and the guide rod through hole (i.e. guide rod tube) on the compensating bearer may also be interchanged, or both sides of the compensating bearer may be provided with the guide rod through hole or the lateral guide rod slot.

Figure 13:
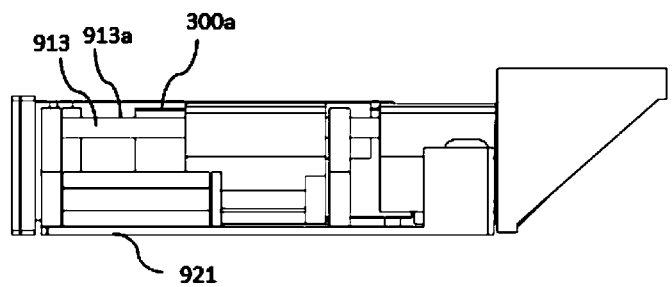
FIG. 13 shows a schematic side diagram of a periscopic optical zoom assembly in one example of the present application.

Further, FIG. 13 shows a schematic side diagram of a periscopic optical zoom assembly in one example of the present application. Referring to FIG. 13, in the present example, the distance between the top surface of the second guide rod 913a and the bearing base 921 is h1, and the distance between the top surface of the lens barrel of the zoom optical assembly (or the top surface 300a of the lens barrel of the compensating optical assembly) and the bearing base 921 is h2. Then h1≤h2+0.4 mm. In other words, in the present example, the top surface of the second guide rod 921 may be higher than the top surface of the zoom optical assembly, but the height difference between the top surface of the second guide rod 913 and the top surface of the zoom optical assembly is not more than 0.4 mm. This design makes it possible to avoid the influence of the height of the second guide rod 913 on the module height. In the example of FIG. 13, the top surface 913a of the second guide 913 may be lower than the top surface of the zoom optical assembly (or the top surface 300a of the lens barrel of the compensating optical assembly). The first guide rod and the second guide rod may be at or approximately at the same height. The top surface of the compensating optical assembly may be at or approximately at the same height as the top surface of the zoom optical assembly.

Further, in one example of the present application, a housing of the adjustable optical assembly may include the bearing base and a cover adapted to the bearing base. The cover is fixed to the bearing base to protect the driving mechanism, the zoom optical assembly and the compensating optical assembly. Meanwhile, the first guide rod and the second guide rod may be restrained from moving in the axial direction by the cover. Specifically, the length of the guide rod (including the first guide rod and the second guide rod) may be substantially the same as an axial distance between an inner side surface of the cover (i.e. an inner side surface of the housing), so that displacement of the guide rod in the axial direction can be avoided. The axial direction here refers to the direction of the optical axis, i.e. the moving direction of the zoom optical assembly and the compensating optical assembly.

Further, in one example of the present application, the bearing base further provides an electrical function. For example, a circuit frame may be embedded in the bearing base by means of insert molding when the bearing base is integrally formed, thereby forming a bearing base having an electrical function. The zoom driving assembly and the compensating driving assembly of the adjustable optical assembly may be both electrically connected to the exterior through the bearing base. Further, the bearing base may include a pad assembly 910 (referring to FIG. 6). The pad assembly 910 is electrically connected to the bearing base. The pad assembly 910 may provide an electrode array so that the bearing base outputs or inputs an electrical signal.

Further, in one example of the present application, the fixed optical assembly is fixed to one side of the adjustable optical assembly (e.g. fixed to one side of the housing) by means of glue bonding, and the photosensitive assembly is fixed to the other side of the adjustable optical assembly (e.g. fixed to the other side of the housing). Except for the height direction, the fixed optical assembly has a smaller size than the adjustable optical assembly.

Figure 14:
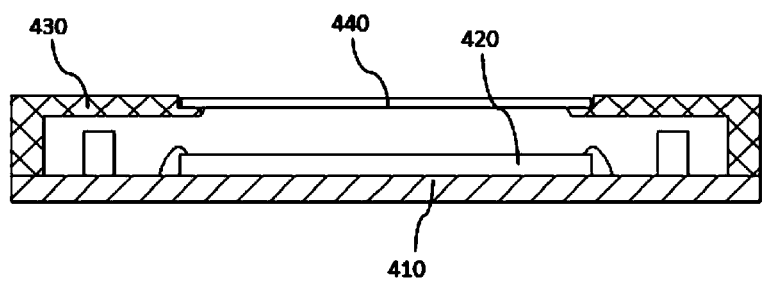
FIG. 14 shows a schematic side diagram of a photosensitive assembly in one example of the present application.

Further, FIG. 14 shows a schematic side diagram of a photosensitive assembly in one example of the present application. Referring to FIG. 14, in the present example, the photosensitive assembly 400 includes a circuit board assembly and a filter assembly. The filter assembly is fixed to the circuit board assembly. The photosensitive assembly 400 is bonded to the adjustable optical assembly through the filter assembly. The circuit board assembly includes a circuit board 410 and a photosensitive element 420, and the circuit board 410 includes a circuit board body, a connector, and a flexible connecting band connecting the circuit board body and the connector. The photosensitive element 420 may be a photosensitive chip, and a back surface of the photosensitive chip is adhered to the circuit board 410 (adhered to the circuit board body) and electrically connected to the circuit board 410. The filter assembly includes a filter bracket 430, and a filter element 440 adhesively fixed to the filter bracket 430.

Figure 15:
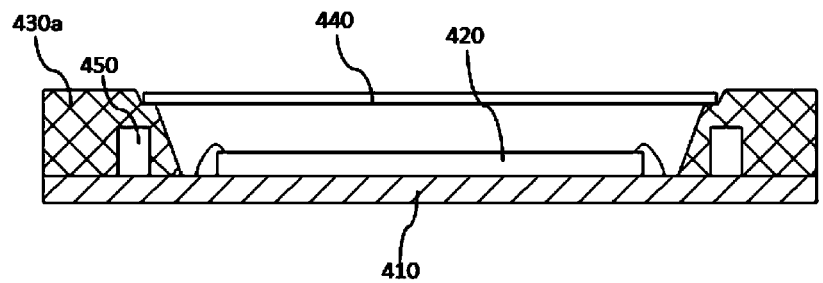
FIG. 15 shows a schematic side diagram of a photosensitive assembly in another example of the present application.

FIG. 15 shows a schematic side diagram of a photosensitive assembly in another example of the present application. Referring to FIG. 15, in the present example, the filter support may be a molding portion 430a. The molding portion 430a is integrally formed on the surface of the circuit board 410 (circuit board body) through a molding process. In the present example, the molding portion 430a may cover an electronic component 450 such as a capacitor or a resistor on the circuit board. This design not only enhances the structural strength of the photosensitive assembly, but also reduces the influence of the contamination on the photosensitive chip caused by the electronic component 450 and the circuit board 410.

Figure 16:
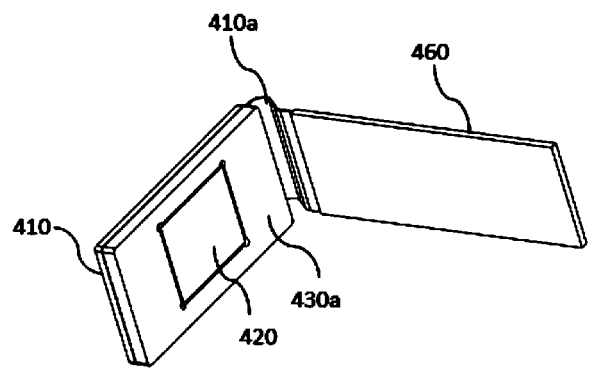
FIG. 16 shows a schematic stereogram of a photosensitive assembly and a driving circuit board in one example of the present application.

Further, FIG. 16 shows a schematic stereogram of a photosensitive assembly and a driving circuit board in one example of the present application. Referring to FIG. 16, in the present example, the circuit board body of the circuit board 410 is connected to a connector (not shown) through a first connecting band so that the photosensitive element 420 is electrically connected to the outside through the connector. The circuit board body is also connected to a driving circuit board 460 through a second connecting band 410a, a driving circuit for the zoom driving assembly and the compensating driving assembly may be disposed in the driving circuit board 460, and the driving circuit may be electrically connected to the photosensitive assembly 400 through the second connecting band 410a. Both of the first connecting band and the second connecting band 410a may be flexible. The second connecting band 410a may be bent by approximately 90 degrees. The driving circuit board may be disposed on the side surface of the housing of the adjustable optical assembly, specifically on the side where the driving assembly is mounted. The side surface of the housing of the adjustable optical assembly may be apertured so that the driving circuit board is electrically connected to the zoom driving assembly (e.g. zoom coil) and the compensating driving assembly (e.g. compensating coil). In another example, the driving circuit board may be electrically connected to the pad assembly on the bearing base (located on the side surface of the bearing base), thereby enabling the driving circuit board to be electrically connected to the zoom driving assembly (e.g. zoom coil) and the compensating driving assembly (e.g. compensating coil) through the bearing base.

Further, in one example of the present application, the periscopic optical zoom module may further include a module housing having an opening adapted to provide a channel for the fixed optical assembly to collect light and to protect the fixed optical assembly from external forces.

Further, in one example of the present application, the outer surfaces of the various components of the periscopic optical zoom module may be blackened (e.g. blacked) to reduce the influence from stray light between the optical assemblies during zoom. Specifically, the inner side surface of the housing may be blackened. The guide rod (including the first guide rod and the second guide rod), the coil (including the zoom coil and the compensating coil), the magnetic element (including the zoom magnetic element and the compensating magnetic element), the bearing base, the zoom bearer, and the compensating bearer may all be blackened.

In the above examples, the reflecting prism may be replaced by other light turning elements. For example in some examples, the reflecting prism may be replaced by a reflecting mirror and a reflecting mirror support.

Figure 17:
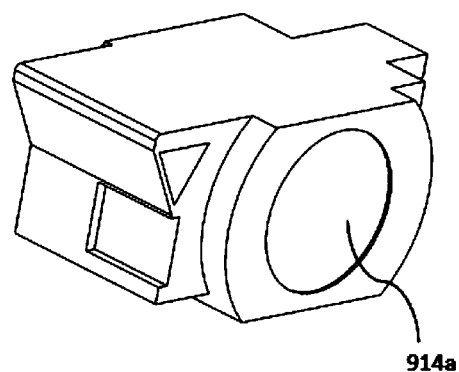
FIG. 17 shows a schematic stereogram of a zoom bearer based on the integrated design of a bearer and a lens barrel in one example of the present application.
Figure 18:
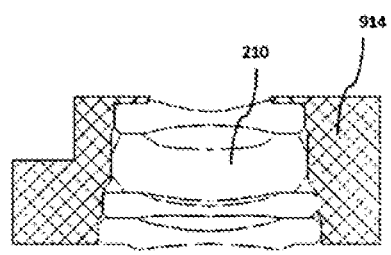
FIG. 18 shows a schematic cross-sectional diagram of a zoom bearer based on the integrated design of a bearer and a lens barrel in one example of the present application.

Further, in one example of the present application, in view of the characteristic that the telephoto camera module has a larger volume, a solution of an integrated design of a lens barrel and a bearer of a driving mechanism is also proposed, so as to reduce the module volume. Specifically, under the premise that the size of the driving mechanism is difficult to be reduced, the module volume can be reduced by integrating the zoom bearer and the compensating bearer of the driving structure with the zoom lens barrel and the compensating lens barrel, and directly mounting the zoom group and the compensating group in the zoom bearer and the compensating bearer. In the present example, the driving mechanism may include a zoom bearer (which may also be referred to as a zoom bearing structure), a compensating bearer (which may also be referred to as a compensating bearing structure), a bearing base, two guide rods, a zoom driving assembly for driving the zoom bearing structure relative to the bearing base, and a compensating driving assembly for driving the compensating bearing structure relative to the bearing base. In particular, in one example of the present application, it is possible that only the zoom lens barrel is integrated with the zoom bearer to constitute the zoom bearing structure in the foregoing examples. FIG. 17 shows a schematic stereogram of a zoom bearer based on the integrated design of a bearer and a lens barrel in one example of the present application. FIG. 18 shows a schematic cross-sectional diagram of a zoom bearer based on the integrated design of a bearer and a lens barrel in one example of the present application. Referring to FIGS. 17 and 18, in the present example, the zoom bearer 914 (i.e. zoom bearing structure) has a first through hole (i.e. zoom through hole 914a). Four lenses (zoom optical lenses 210) are directly mounted in the first through hole and are assembled together through the through hole to form a zoom group.

Figure 19:
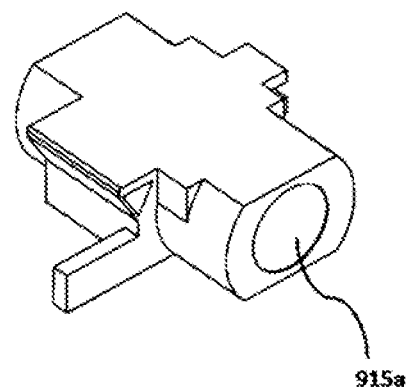
FIG. 19 shows a schematic stereogram of a compensating bearer based on the integrated design of a bearer and a lens barrel in one example of the present application.
Figure 20:
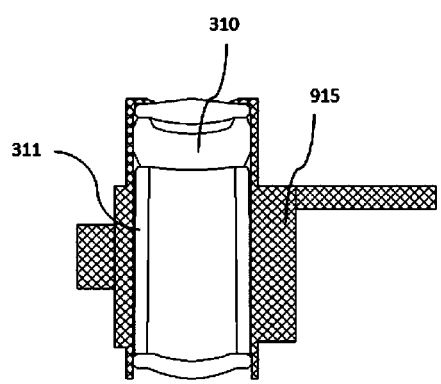
FIG. 20 shows a schematic cross-sectional diagram of a compensating bearer based on the integrated design of a bearer and a lens barrel in one example of the present application.

In another example, it is possible that only the compensating lens barrel is integrated with the compensating bearer to constitute the compensating bearing structure in the foregoing examples. FIG. 19 shows a schematic stereogram of a compensating bearer based on the integrated design of a bearer and a lens barrel in one example of the present application. FIG. 20 shows a schematic cross-sectional diagram of a compensating bearer based on the integrated design of a bearer and a lens barrel in one example of the present application. Referring to FIGS. 19 and 20, in the present example, the compensating bearer 915 (i.e. compensating bearing structure) has a second through hole (i.e. compensating through hole 915a). Three lenses (compensating optical lenses 310) are directly mounted in the first through hole and are assembled together through the through hole to form a compensating group. In the present example, the distance between the second and third compensating optical lenses is long, and a cylindrical supporting member 311 may be used to support the two compensating optical lenses so that the distance between the two compensating optical lenses is always maintained at the distance required by the optical design.

In the above examples, when designing the optical system of the telephoto lens, one of the zoom optical assembly and the compensating optical assembly may have a large size, and therefore, by integrating the bearer and the lens barrel only on the optical assembly having a large size, the module can be effectively miniaturized. In another example, both the zoom optical assembly and the compensating optical assembly may definitely employ a bearing structure instead of the lens barrel and the bearer at the same time when the sizes of both optical assemblies are too large to meet the requirements. In the present example, various lenses of the zoom optical assembly are assembled together to form a zoom group, and various lenses of the compensating optical assembly are assembled together to form a compensating group. The various lenses of the zoom group are mounted directly in the first through hole of the zoom bearing structure and assembled together by the zoom bearing structure. And the various lenses of the compensating group are mounted directly in the second through hole of the compensating bearing structure and assembled together by the compensating bearing structure.

Further, in order to avoid the influence of jitter on the telephoto camera module during the shooting process, an anti jitter device is added to avoid the occurrence of this situation. Since the telephoto lens described in the present application is suitable for performing optical zoom, the zoom lens is linked with the driving mechanism. The prism will move to cause the optical axis between the various lens assemblies to be misaligned, and it is difficult to dispose an anti jitter device on the lens. Therefore, the jitter of the telephoto camera module during shooting may be compensated by disposing an anti jitter structure in the photosensitive assembly, for example by controlling micro electro mechanical systems (MEMS) to drive the motion of a photosensitive element. Alternatively, the telephoto camera module is disposed in a pan-tilt for preventing jitter.

3. Assembly Solution

Figure 21:
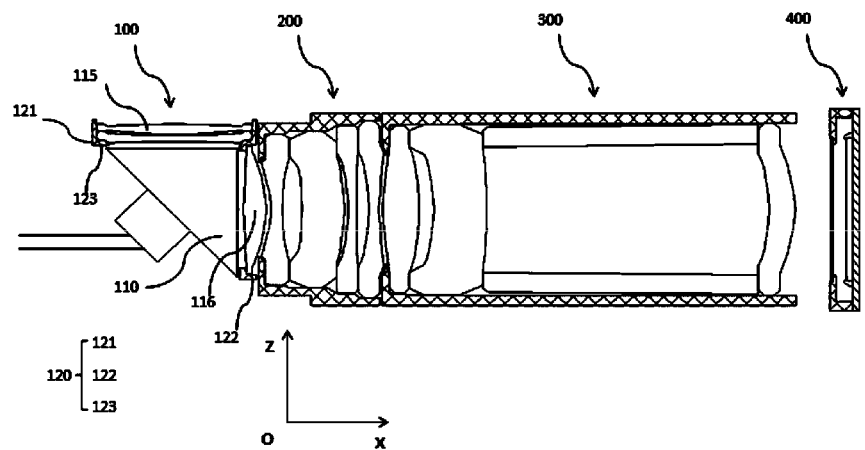
FIG. 21 shows a schematic diagram of an active calibration on a fixed lens assembly by a periscopic optical zoom module in one example of the present application.
Figure 22:
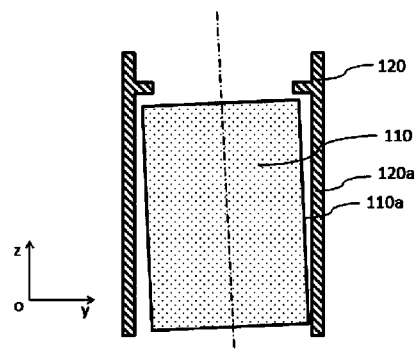
FIG. 22 shows a schematic side diagram of a relative position between a fixed assembly housing and a light turning element in one example of the present application.

According to one example of the present application, a periscopic continuous optical zoom module (sometimes referred to simply as a periscopic optical zoom module) is provided. The periscopic optical zoom module includes a fixed optical assembly, an adjustable optical assembly and a photosensitive assembly. The fixed optical assembly includes a light turning element and at least two optical lenses on two sides of the light turning element. For example, the fixed optical assembly described in the foregoing may have three fixed optical lenses, two of which are located on a light entering side of the light turning element (e.g. reflecting prism) and one of which is located on a light exiting side of the light turning element. Due to the position offset of the light turning element located in the middle, there is a large offset between the optical axis of light emitted from the light turning element and the optical axis of the lens located on the light exiting side of the light turning element. In severe cases, an optical system composed of the fixed optical assembly, the zoom optical assembly and the compensating optical assembly may not be imaged normally. Therefore, in the present example, the fixed optical assembly may be assembled by means of an active calibration. FIG. 21 shows a schematic diagram of an active calibration on a fixed lens assembly by a periscopic optical zoom module in one example of the present application. Referring to FIG. 21, in the present example, the fixed optical assembly 100 includes: a light turning element 110, at least one light-entering lens 115, at least one light-exiting lens 116, and a fixed assembly housing 120. The light turning element 110 has a reflecting surface, an entering surface and an exiting surface for turning entering light. The fixed assembly housing 120 includes a light-entering lens barrel portion 121, a light-exiting lens barrel portion 122 and a light turning element mounting portion 123. The light-entering lens barrel portion 121 and the light-exiting lens barrel portion 122 have axes perpendicular to each other. The at least one light-entering lens 115 is mounted on an inner side surface of the light-entering lens barrel portion 121, and the at least one light-exiting lens 116 is mounted on an inner side surface of the light-exiting lens barrel portion 122. The light turning element mounting portion 123 is disposed at an end of the light-entering lens barrel portion 121 near the reflecting surface (an end of the light-entering lens portion near the bottom in FIG. 1) and an end of the light-exiting lens barrel portion 122 near the reflecting surface (an end of the light-exiting lens barrel portion 122 near the left side in FIG. 1). In the present example, the light turning element is fixed to the light turning element mounting portion, and the relative position between the light turning element and the light turning element mounting portion is determined by an active calibration. Specifically, the light turning element is a light reflecting prism having two prism side surfaces each intersecting with the reflecting surface, the entering surface and the exiting surface. The light turning element mounting portion may have two housing side walls so as to form a groove-like accommodating structure, and the light reflecting prism may be disposed between the two housing side walls, i.e. in the accommodating structure. FIG. 22 shows a schematic side diagram of a relative position between a fixed assembly housing and a light turning element in one example of the present application, as viewed along a positive x-axis in FIG. 21. Referring to FIG. 22, in the present example, the prism side surface 110a of the light turning element 110 and the housing side wall 120a may have a non-zero inclination angle. This inclination angle is a calibration result determined by the active calibration. The active calibration is a process of successively arranging the at least one light-entering lens 115, the light turning element 110, the at least one light-exiting lens 116, the zoom optical assembly 200, the compensating optical assembly 300, and the photosensitive assembly 400 into a periscopic telephoto optical imaging system (referring to FIG. 21), and then adjusting the relative position of various optical elements according to a measured telephoto imaging result obtained by energizing the photosensitive assembly. More specifically, in the present example, the active calibration includes a first active calibration which is a process of successively arranging the at least one light-entering lens, the light turning element, the at least one light-exiting lens, the zoom optical assembly, the compensating optical assembly, and the photosensitive assembly into the periscopic telephoto optical imaging system when the fixed optical assembly 110 and the adjustable optical assembly 120 are separated from each other, and then calibrating the relative position between the light turning element and the light turning element mounting portion according to the measured telephoto imaging result obtained by energizing the photosensitive assembly.

Further, in one example of the present application, the inclination angle between the prism side surface 110a and the housing side wall 120a (referring to FIG. 22) is less than 1 degree. Furthermore, in a preferred example of the present application, the inclination angle between the prism side surface and the housing side wall is less than 0.5 degrees.

Further, in one example of the present application, the inclination angle between the prism side surface and the housing side wall has a first rotational direction component and a second rotational direction component. The first rotational direction component is a rotational component that rotates around an x-axis, the second rotational direction component is a rotational component that rotates around a y-axis, and the x-axis coincides with the direction of the main optical axis of the telephoto optical imaging system (i.e. coinciding with the direction of an optical axis of a light exiting side of the fixed optical assembly). Referring to FIGS. 21 and 22 in combination, the y-axis is perpendicular to the x-axis and the z-axis, and the z-axis coincides with the direction of an optical axis of a light entering side of the fixed optical assembly.

Further, in one example of the present application, the distance between the prism side surface and the housing side wall may be 10-100 µm.

Further, in one example of the present application, the prism side surface includes a first prism side surface and a second prism side surface located at opposite positions, the housing side wall includes a first housing side wall and a second housing side wall located at opposite positions, and the distance between the first prism side surface and the first housing side wall may not be equal to the distance between the second prism side surface and the second housing side wall. That is, during the active calibration, the light turning element 110 may translate along the y-axis, and a final position of a central axis of the light turning element 110 determined by the active calibration may have an offset relative to a central axis of the fixed assembly housing.

Further, in one example of the present application, the light turning element bears against and is fixed to the light turning element mounting portion by means of an adhesive material.

Further, in one example of the present application, the end of the light-entering lens barrel portion near the reflecting surface has a first end surface, and the end of the light-exiting lens barrel portion near the reflecting surface has a second end surface. An arrangement position of the adhesive material includes: one or more of a gap between the light entering surface and the first end surface, a gap between the second end surface and the exiting surface, and a gap between the prism side surface and the housing side wall. For example, in one example, an adhesive material for bonding the light turning element and the light turning element mounting portion may be arranged only in a gap between the light entering surface and the first end surface. In another example, an adhesive material for bonding the light turning element and the light turning element mounting portion may be arranged only in a gap between the prism side surface and the housing side wall. In still another example, an adhesive material for bonding the light turning element and the light turning element mounting portion may be arranged in both of the gap between the light entering surface and the first end surface, and the gap between the second end surface and the light exiting surface. In yet another example, an adhesive material for bonding the light turning element and the light turning element mounting portion may be arranged in all of the gap between the light entering surface and the first end surface, the gap between the second end surface and the light exiting surface, and the gap between the prism side surface and the housing side wall.

Further, in one example of the present application, the adhesive material is adapted to be cured by one or more of visible light, ultraviolet light, and baking.

In the above examples, the light-entering lens barrel portion, the light-exiting lens barrel portion and the light turning element mounting portion are integrally formed in the fixed assembly housing. For example, the portions may be integrally formed by an injection molding process.

Figure 23:
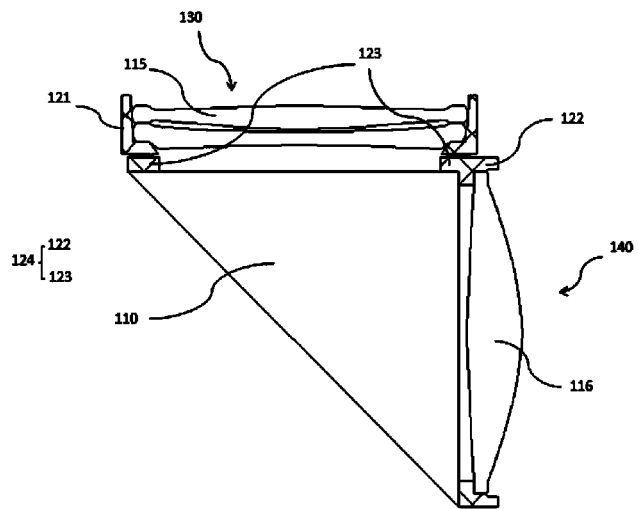
FIG. 23 shows a schematic cross-sectional diagram of a fixed optical assembly in one modified example of the present application.

In some modified examples of the present application, in the fixed assembly housing, one of the light-entering lens barrel portion and the light-exiting lens barrel portion is separately formed while the other portion is integrally formed with the light turning element mounting portion to constitute an integrally formed member, and the separately formed member is fixed to the integrally formed member so as to constitute the fixed assembly housing. A relative position between the separately formed member and the integrally formed member may be determined by the active calibration. Specifically, FIG. 23 shows a schematic cross-sectional diagram of a fixed optical assembly in one modified example of the present application. Referring to FIG. 23, the light-entering lens barrel portion 121 may be separately formed. The light-exiting lens barrel portion 122 and the light turning element mounting portion 123 are integrally formed to constitute an integrally formed member 124.

Figure 24:
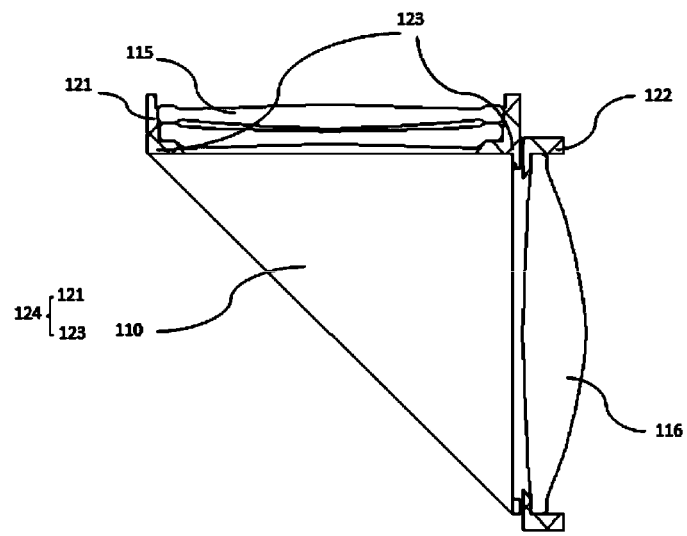
FIG. 24 shows a schematic cross-sectional diagram of a fixed optical assembly in another modified example of the present application.

FIG. 24 shows a schematic cross-sectional diagram of a fixed optical assembly in another modified example of the present application. Referring to FIG. 24, in the present example, the light-exiting lens barrel portion 121 and the light turning element mounting portion 123 may be integrally formed to constitute an integrally formed member 124. The light-exiting lens barrel portion 122 may be separately formed.

Further, in a modified example of the present application, a gap between the separately formed member and the integrally formed member is 10-100 μm in the fixed assembly housing. The gap may be suitable for performing an active calibration and arranging adhesive glue.

Further, in a modified example of the present application, in the fixed optical assembly, when the separately formed member is the light-entering lens barrel portion, a non-zero angle is provided between the optical axis of the light turning element on the light entering side thereof and the axis of the light-entering lens barrel portion. In another modified example of the present application, when the separately formed member is the light-exiting lens barrel portion, a non-zero angle is provided between the optical axis of the light turning element on the light exiting side thereof and the axis of the light-exiting lens barrel portion. The non-zero angle is determined by the active calibration.

Figure 25:
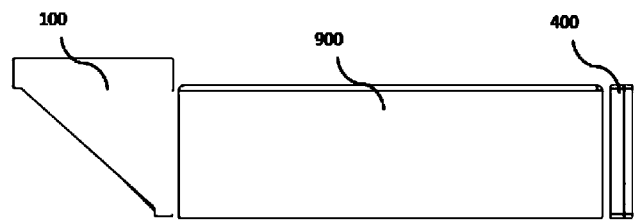
FIG. 25 shows a schematic assembly diagram of the periscopic optical zoom module in one example of the present application.

Further, in one example of the present application, in the periscopic optical zoom camera module, the adjustable optical assembly includes a driving mechanism, the zoom optical assembly and the compensating optical assembly. The driving mechanism includes a driving element and an adjustable assembly housing. The driving element is adapted to respectively drive the zoom optical assembly and the compensating optical assembly to move along an x-axis relative to the adjustable assembly housing. The x-axis coincides with the direction of a main optical axis of the telephoto optical imaging system. The photosensitive assembly includes a filter assembly, a photosensitive chip and a circuit board. FIG. 25 shows a schematic assembly diagram of the periscopic optical zoom module in one example of the present application. Referring to FIG. 25, in the present example, the fixed assembly housing is fixed to the adjustable assembly housing, and a relative position between the fixed assembly housing and the adjustable assembly housing is determined by a second active calibration. The second active calibration is that when the fixed optical assembly 100 and the adjustable optical assembly 900 are separated from each other, the fixed optical assembly, the zoom optical assembly, the compensating optical assembly, and the photosensitive assembly are successively arranged into the periscopic telephoto optical imaging system, and then the relative position between the fixed assembly housing and the adjustable assembly housing is calibrated according to the measured telephoto imaging result obtained by energizing the photosensitive assembly.

Further, in one example of the present application, there is a gap of 10-100 μm (referring to FIG. 25) between the fixed optical assembly 100 and the adjustable optical assembly 900.

Further, in one example of the present application, the optical axis of the light exiting side of the fixed optical assembly and the optical axis of the adjustable optical assembly may have a non-zero angle.

Further, in one example of the present application, the angle between the optical axis of the light exiting side of the fixed optical assembly and the optical axis of the adjustable optical assembly is less than 1 degree. Furthermore, in a preferred example of the present application, the angle between the optical axis of the light exiting side of the fixed optical assembly and the optical axis of the adjustable optical assembly is less than 0.5 degrees.

According to one example of the present application, an assembly method for the fixed optical assembly is also provided. Referring to FIG. 21 in combination, the assembly method for the fixed optical assembly includes the following steps.

At step S1, a fixed assembly housing 120, a light turning element 110, at least one light-entering lens 115, and at least one light-exiting lens 116 are prepared. The light turning element 110 has a reflecting surface for turning entering light, an entering surface and an exiting surface. The fixed assembly housing 120 includes a light-entering lens barrel portion 121, a light-exiting lens barrel portion 122 and a light turning element mounting portion 123. The light-entering lens barrel portion 121 and the light-exiting lens barrel portion 122 have axes perpendicular to each other. The at least one light-entering lens 115 is mounted on an inner side surface of the light-entering lens barrel portion 121, and the at least one light-exiting lens 116 is mounted on an inner side surface of the light-exiting lens barrel portion 122. The light turning element mounting portion 123 is disposed at an end of the light-entering lens barrel portion 121 near the reflecting surface and an end of the light-exiting lens barrel portion 122 near the reflecting surface.

At step S2, the light turning element 110 and the fixed assembly housing 120 equipped with the at least one light-entering lens 115 and the at least one light-exiting lens 116 are respectively picked, and the at least one light-entering lens 115, the light turning element 110, the at least one light-exiting lens 116, the zoom optical assembly 200, the compensating optical assembly 300, and the photosensitive assembly 400 are successively arranged into a periscopic telephoto optical imaging system, so as to complete pre-positioning. Referring to FIG. 21, FIG. 21 may be regarded as a state after the pre-positioning is completed.

At step S3, an active calibration is performed to calibrate a relative position between the light turning element and the light turning element mounting portion according to a measured telephoto imaging result obtained by energizing the photosensitive assembly. The active calibration includes moving the light turning element in at least one moving direction of x-axis translation, y-axis translation, z-axis translation, rotation around an x-axis, rotation around a y-axis, and rotation around a z-axis. The x-axis coincides with the direction of a main optical axis of the telephoto optical imaging system (coinciding with the direction of an optical axis of a light exiting side of the fixed optical assembly), the y-axis is perpendicular to the x-axis and the z-axis, and the z-axis coincides with the direction of an optical axis of a light entering side of the fixed optical assembly.

At step S4, the light turning element and the light turning element mounting portion are bonded based on the relative position determined by the active calibration. In this step, the light turning element and the light turning element mounting portion may be bonded by an adhesive material which is adapted to be cured by one or more of visible light, ultraviolet light, and baking.

In one example of the present application, the adhesive material may be arranged, step S3 may be performed to complete the active calibration, and then the adhesive material may be cured by one or more of visible light, ultraviolet light, and baking.

In another example of the present application, step S3 may be performed to complete the active calibration, the adhesive material may be arranged, the light turning element and the light turning element mounting portion may then be returned to the relative position determined by the active calibration, and the adhesive material may be finally cured by one or more of visible light, ultraviolet light, and baking.

According to another example of the present application, another assembly method for a fixed optical assembly is also provided. The method may include the following steps.

At step S1', a first fixed sub-lens 130 and a second fixed sub-lens 140 separated from each other are prepared (referring to FIG. 24). The first fixed sub-lens includes a light turning element 110, at least one light-entering lens 115, and a first housing member. The first housing member includes a light-entering lens barrel portion 121 and a light turning element mounting portion 123. The second fixed sub-lens includes at least one light-exiting lens 116 and a second housing member. The second housing member includes a light-exiting lens barrel portion 122. The at least one light-entering lens 115 is mounted on an inner side surface of the light-entering lens barrel portion 121. The light turning element 110 is mounted on the light turning element mounting portion 123. The at least one light-exiting lens 116 is mounted on an inner side surface of the light-exiting lens barrel portion 122.

At step S2', the first fixed sub-lens 130 and the second fixed sub-lens 140 are respectively picked to make axes of the light-entering lens barrel portion 121 and the light-exiting lens barrel portion 122 perpendicular to each other, and the at least one light-entering lens, the light turning element, the at least one light-exiting lens, the zoom optical assembly, the compensating optical assembly, and the photosensitive assembly are successively arranged into a periscopic telephoto optical imaging system, so as to complete pre-positioning.

At step S3', an active calibration is performed to calibrate a relative position between the first fixed sub-lens and the second fixed sub-lens according to a measured telephoto imaging result obtained by energizing the photosensitive assembly.

At step S4', the first fixed sub-lens and the second fixed sub-lens are bonded based on the relative position determined by the active calibration.

According to still another example of the present application, another assembly method for a fixed optical assembly is also provided. The method may include the following steps.

At step S1", a first fixed sub-lens 130 and a second fixed sub-lens 140 separated from each other are prepared (referring to FIG. 23). The first fixed sub-lens 130 includes at least one light-entering lens 115 and a first housing member. The first housing member includes a light-entering lens barrel portion 121. The second fixed sub-lens 140 includes a light turning element 110, at least one light-exiting lens 116 and a second housing member. The second housing member includes a light-exiting lens barrel portion 122 and a light turning element mounting portion 123. The at least one light-entering lens 115 is mounted on an inner side surface of the light-entering lens barrel portion 121. The light turning element 110 is mounted on the light turning element mounting portion 123. The at least one light-exiting lens 116 is mounted on an inner side surface of the light-exiting lens barrel portion 122.

At step S2", the first fixed sub-lens 130 and the second fixed sub-lens 140 are respectively picked to make axes of the light-entering lens barrel portion 121 and the light-exiting lens barrel portion 122 perpendicular to each other, and the at least one light-entering lens, the light turning element, the at least one light-exiting lens, the zoom optical assembly, the compensating optical assembly, and the photosensitive assembly are successively arranged into a periscopic telephoto optical imaging system, so as to complete pre-positioning.

At step S3", an active calibration is performed to calibrate a relative position between the first fixed sub-lens and the second fixed sub-lens according to a measured telephoto imaging result obtained by energizing the photosensitive assembly.

At step S4", the first fixed sub-lens and the second fixed sub-lens are bonded based on the relative position determined by the active calibration.

Figure 26:
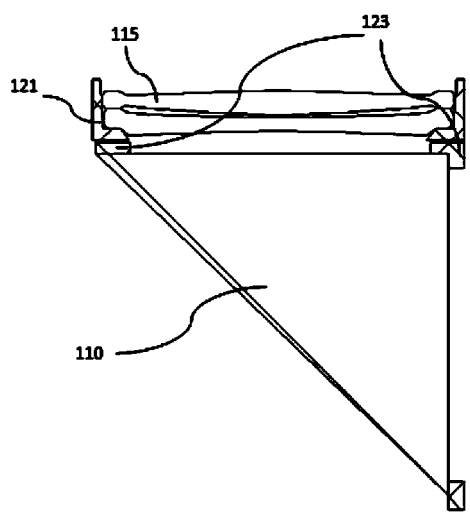
FIG. 26 shows an assembled fixed optical assembly in another example of the present application.

Further, according to another example of the present disclosure, another assembly method for a fixed optical assembly is also provided. All of fixed lenses of the fixed optical assembly are located on the same side of the reflecting prism. That is, all of the fixed lenses are located on the light entering side of the reflecting prism, or all of the fixed lenses are located on the light exiting side of the reflecting prism. The following is an example of a solution in which all of the fixed lenses are located on the light entering side of the reflecting prism. For example, the fixed optical assembly, the zoom optical assembly and the compensating optical assembly may have two, five, and three optical lenses, respectively. FIG. 26 shows an assembled fixed optical assembly in another example of the present application. Referring to FIG. 26, in the present example, the two optical lenses of the fixed optical assembly are disposed on the light entering side of the reflecting prism (i.e. the light turning element 110), and therefore the two fixed lenses may be referred to as light-entering lenses 115. In the present example, the assembly method for the fixed optical assembly may include the following steps.

At step S1, a first fixed sub-lens and a second fixed sub-lens separated from each other are prepared. The first fixed sub-lens includes at least one fixed lens and a lens barrel portion. The second fixed sub-lens includes a light turning element 110 and a light turning element mounting portion 123. The at least one fixed lens is mounted on an inner side surface of the lens barrel portion, and the light turning element 110 is mounted on the light turning element mounting portion 123. In the present example, the fixed lens is a light-entering lens 115 (or light-exiting lens), and the lens barrel portion is a light-entering lens barrel portion 121 (or light-exiting lens barrel portion).

At step S2, the first fixed sub-lens and the second fixed sub-lens are respectively picked, and the at least one fixed lens, the light turning element, the zoom optical assembly, the compensating optical assembly, and the photosensitive assembly are arranged into a periscopic telephoto optical imaging system, so as to complete pre-positioning.

At step S3, an active calibration is performed to calibrate a relative position between the first fixed sub-lens and the second fixed sub-lens according to a measured telephoto imaging result obtained by energizing the photosensitive assembly.

At step S4, the first fixed sub-lens and the second fixed sub-lens are bonded based on the relative position determined by the active calibration. In the present example, the active calibration in both substantially perpendicular directions is not required, so that the difficulty of active calibration and the difficulty of assembly of the fixed optical assembly can be reduced.

Further, according to another example of the present disclosure, another assembly method for a fixed optical assembly is also provided. All of fixed lenses of the fixed optical assembly are located on the same side of the reflecting prism. That is, all of the fixed lenses are located on the light entering side of the reflecting prism, or all of the fixed lenses are located on the light exiting side of the reflecting prism. The following is an example of a solution in which all of the fixed lenses are located on the light entering side of the reflecting prism. For example, the fixed optical assembly, the zoom optical assembly and the compensating optical assembly may have two, five, and three optical lenses, respectively. The two optical lenses of the fixed optical assembly are disposed on the light entering side of the reflecting prism (i.e. the light turning element), and therefore the two fixed lenses may be referred to as light-entering lenses. In the present example, the assembly method for the fixed optical assembly may include the following steps.

At step 1', a first fixed sub-lens and a light turning element separated from each other are prepared. The first fixed sub-lens includes at least one fixed lens and a fixed assembly housing. The fixed assembly housing includes a lens barrel portion and a light turning element mounting portion. The at least one fixed lens is mounted on an inner side surface of the lens barrel portion. The fixed lens is a light-entering lens (or a light-exiting lens), and the lens barrel portion is a light-entering lens barrel portion (or a light-exiting lens barrel portion).

At step 2', the first fixed sub-lens and the light turning element are respectively picked, and the at least one fixed lens, the light turning element, the zoom optical assembly, the compensating optical assembly, and the photosensitive assembly are arranged into a periscopic telephoto optical imaging system, so as to complete pre-positioning.

At step 3', an active calibration is performed to calibrate a relative position between the first fixed sub-lens and the light turning element according to a measured telephoto imaging result obtained by energizing the photosensitive assembly.

At step 4', the first fixed sub-lens and the light turning element are bonded based on the relative position determined by the active calibration.

In the present example, the active calibration is different from the arrangement position of the adhesive material for curing an active calibration result compared to the previous example. In the present example, the active calibration in both substantially perpendicular directions is not required, so that the difficulty of active calibration and the difficulty of assembly of the fixed optical assembly can be reduced.

According to one example of the present application, an assembly method for a periscopic optical zoom module is also provided. The method includes the following steps.

At step S10, a fixed optical assembly 100, an adjustable optical assembly 900 and a photosensitive assembly 400 separated from each other are prepared (referring to FIG. 25). The fixed optical assembly may be assembled based on the assembly method for the fixed optical assembly according to any one of the foregoing examples. The adjustable optical assembly 900 may include a driving mechanism, the zoom optical assembly and the compensating optical assembly. The driving mechanism includes a driving element and an adjustable assembly housing. The driving element is adapted to respectively drive the zoom optical assembly and the compensating optical assembly to move along an x-axis relative to the adjustable assembly housing. The x-axis coincides with the direction of a main optical axis of the telephoto optical imaging system. The photosensitive assembly may include a filter assembly, a photosensitive chip and a circuit board.

At step S20, the fixed optical assembly 100 and the adjustable optical assembly 900 are respectively picked, and at least one light-entering lens, a light turning element, at least one light-exiting lens, the zoom optical assembly, the compensating optical assembly, and the photosensitive assembly are successively arranged into a periscopic telephoto optical imaging system, so as to complete pre-positioning.

At step S30, an active calibration is performed to calibrate a relative position between the fixed optical assembly and the adjustable optical assembly according to a measured telephoto imaging result obtained by energizing the photosensitive assembly.

Figure 27:
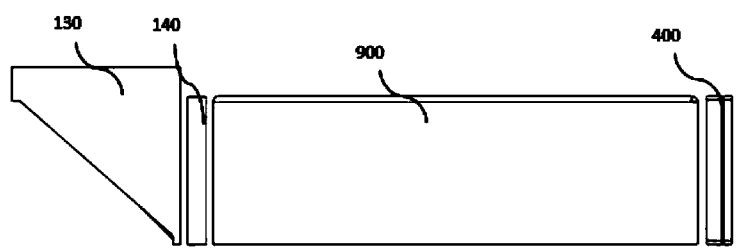
FIG. 27 shows a schematic assembly diagram of the periscopic optical zoom module in another example of the present application.

At step S40, the fixed optical assembly and the adjustable optical assembly are bonded based on the relative position determined by the active calibration, According to another example of the present application, an assembly method for a periscopic optical zoom module is also provided. FIG. 27 shows a schematic assembly diagram of the periscopic optical zoom module in another example of the present application. Referring to FIG. 27, the assembly method for the periscopic optical zoom module in the present example includes the following steps.

At step S10', a first fixed sub-lens 130, a second fixed sub-lens 140, an adjustable optical assembly 900, and a photosensitive assembly 400 separated from each other are prepared. The first fixed sub-lens 130 includes a light turning element, at least one light-entering lens, and a first housing member. The first housing member includes a light-entering lens barrel portion and a light turning element mounting portion. The second fixed sub-lens 140 includes at least one light-exiting lens and a second housing member. The second housing member includes a light-exiting lens barrel portion. The at least one light-entering lens is mounted on an inner side surface of the light-entering lens barrel portion. The light turning element is mounted on the light turning element mounting portion. The at least one light-exiting lens is mounted on an inner side surface of the light-exiting lens barrel portion. The adjustable optical assembly 900 includes a driving mechanism, the zoom optical assembly and the compensating optical assembly. The driving mechanism includes a driving element and an adjustable assembly housing. The driving element is adapted to respectively drive the zoom optical assembly and the compensating optical assembly to move along an x-axis relative to the adjustable assembly housing. The x-axis coincides with the direction of a main optical axis of the telephoto optical imaging system. The photosensitive assembly 400 includes a filter assembly, a photosensitive chip and a circuit board, etc.

At step S20', the first fixed sub-lens 130, the second fixed sub-lens 140 and the adjustable optical assembly 900 are respectively picked to make axes of the light-entering lens barrel portion and the light-exiting lens barrel portion substantially perpendicular to each other, and the at least one light-entering lens, the light turning element, the at least one light-exiting lens, the zoom optical assembly, the compensating optical assembly, and the photosensitive assembly are successively arranged into a periscopic telephoto optical imaging system, so as to complete pre-positioning.

At step S30', an active calibration is performed to calibrate a relative position between the first fixed sub-lens and the second fixed sub-lens and a relative position between the second fixed sub-lens and the adjustable optical assembly according to a measured telephoto imaging result obtained by energizing the photosensitive assembly.

At step S40', the first fixed sub-lens and the second fixed sub-lens are bonded and the second fixed sub-lens and the adjustable optical assembly are bonded based on the relative positions determined by the active calibration.

Figure 28:
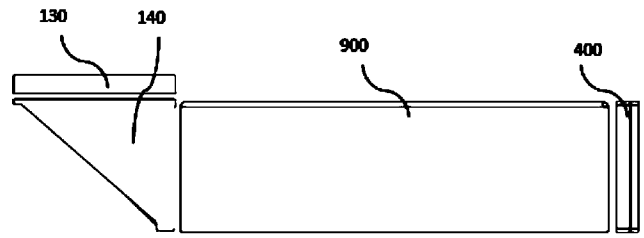
FIG. 28 shows a schematic assembly diagram of the periscopic optical zoom module in still another example of the present application.

According to still another example of the present application, still another assembly method for a periscopic optical zoom module is also provided. FIG. 28 shows a schematic assembly diagram of the periscopic optical zoom module in still another example of the present application. Referring to FIG. 28, the assembly method for the periscopic optical zoom module in the present example includes the following steps.

At step S10", a first fixed sub-lens 130, a second fixed sub-lens 140, an adjustable optical assembly 900, and a photosensitive assembly 400 separated from each other are prepared. The first fixed sub-lens 130 includes at least one light-entering lens and a first housing member. The first housing member includes a light-entering lens barrel portion. The second fixed sub-lens 140 includes a light turning element, at least one light-exiting lens and a second housing member. The second housing member includes a light-exiting lens barrel portion and a light turning element mounting portion. The at least one light-entering lens is mounted on an inner side surface of the light-entering lens barrel portion. The light turning element is mounted on the light turning element mounting portion. The at least one light-exiting lens is mounted on an inner side surface of the light-exiting lens barrel portion. The adjustable optical assembly 900 includes a driving mechanism, the zoom optical assembly and the compensating optical assembly. The driving mechanism includes a driving element and an adjustable assembly housing. The driving element is adapted to respectively drive the zoom optical assembly and the compensating optical assembly to move along an x-axis relative to the adjustable assembly housing. The x-axis coincides with the direction of a main optical axis of the telephoto optical imaging system. The photosensitive assembly 400 includes a filter assembly, a photosensitive chip and a circuit board, etc.

At step S20", the first fixed sub-lens 130, the second fixed sub-lens 140 and the adjustable optical assembly 900 are respectively picked to make axes of the light-entering lens barrel portion and the light-exiting lens barrel portion substantially perpendicular to each other, and the at least one light-entering lens, the light turning element, the at least one light-exiting lens, the zoom optical assembly, the compensating optical assembly, and the photosensitive assembly are successively arranged into a periscopic telephoto optical imaging system, so as to complete pre-positioning.

At step S30", an active calibration is performed to calibrate a relative position between the first fixed sub-lens and the second fixed sub-lens and a relative position between the second fixed sub-lens and the adjustable optical assembly according to a measured telephoto imaging result obtained by energizing the photosensitive assembly.

At step S40", the first fixed sub-lens and the second fixed sub-lens are bonded and the second fixed sub-lens and the adjustable optical assembly are bonded based on the relative positions determined by the active calibration.

Figure 29:
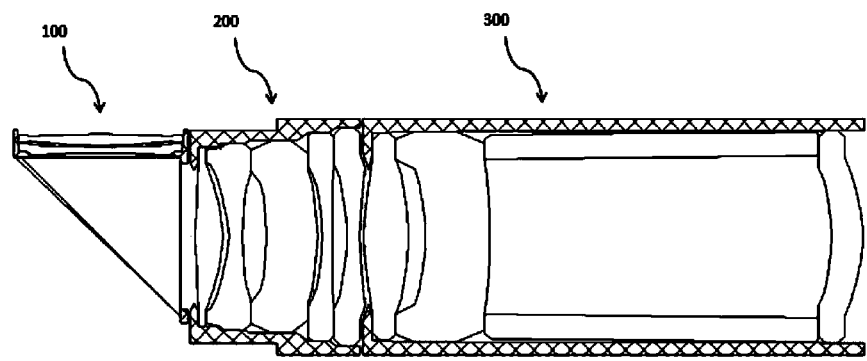
FIG. 29 shows a schematic diagram of an assembly state of a periscopic optical zoom lens in which fixed lens are all located on a light entering side in one example of the present application.

Further, in one example of the present application, another assembly method for a periscopic optical zoom module is also provided. In the periscopic optical zoom module, all of fixed lenses of the fixed optical assembly may be located on a light entering side. For example, FIG. 29 shows a schematic diagram of an assembly state of a periscopic optical zoom lens in which a fixed lens may be located on a light entering side in one example of the present application. In the present example, the fixed optical assembly 100, the zoom optical assembly 200 and the compensating optical assembly 300 may have two, five and three optical lenses, respectively. The two optical lenses of the fixed optical assembly are disposed on the light entering side of the reflecting prism (i.e. the light turning element), and therefore the two fixed lenses may be referred to as light-entering lenses. The assembly method of the present example may refer to the corresponding example of FIG. 21 (the only difference is that the light-exiting lens barrel portion is omitted from the fixed assembly housing of the present example), and the descriptions thereof will not be repeated here. It should be noted that in the present example, all of the optical lenses of the fixed optical assembly are located on a light entering side of a prism (i.e. light turning element), whereby the manufacturing difficulty of the fixed optical assembly can be reduced, and the risk of optical axis deviation can be reduced.

Figure 30:
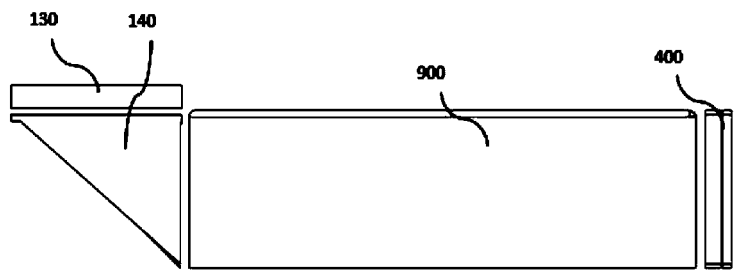
FIG. 30 shows a schematic diagram of an assembly state of a periscopic optical zoom module in which fixed lens are all located on a light entering side in one example of the present application.

Further, FIG. 30 shows a schematic diagram of an assembly state of a periscopic optical zoom module in which a fixed lens may be located on a light entering side in one example of the present application. Referring to FIG. 30, in one example of the present application, the assembly method for the periscopic optical zoom module in the present example may include the following steps.

At step S100, a first fixed sub-lens 130, a second fixed sub-lens 140, an adjustable optical assembly 900, and a photosensitive assembly 400 separated from each other are prepared.

The first fixed sub-lens 130 includes a lens barrel portion and at least one fixed lens mounted on an inner side surface of the lens barrel portion. The second fixed sub-lens 140 includes a light turning element mounting portion and a light turning element mounted on the light turning element mounting portion. The fixed lens is a light-entering lens (in other examples, the fixed lens may also be a light-exiting lens). The lens barrel portion is a light-entering lens barrel portion (in other examples, the lens barrel portion may also be a light-exiting lens barrel portion).

The adjustable optical assembly 900 includes a driving mechanism, the zoom optical assembly and the compensating optical assembly. The driving mechanism includes a driving element and an adjustable assembly housing. The driving element is adapted to respectively drive the zoom optical assembly and the compensating optical assembly to move along an x-axis relative to the adjustable assembly housing. The x-axis coincides with the direction of a main optical axis of the telephoto optical imaging system.

The photosensitive assembly 400 includes a filter assembly, a photosensitive chip and a circuit board, etc.

At step S200, the first fixed sub-lens 130, the second fixed sub-lens 140 and an adjustable optical assembly 900 are respectively picked, and the at least one fixed lens, the light turning element, the zoom optical assembly, the compensating optical assembly, and the photosensitive assembly are arranged into a periscopic telephoto optical imaging system, so as to complete pre-positioning.

At step S300, an active calibration is performed to calibrate a relative position between the first fixed sub-lens and the second fixed sub-lens and a relative position between the second fixed sub-lens and the adjustable optical assembly according to a measured telephoto imaging result obtained by energizing the photosensitive assembly.

At step S400, the first fixed sub-lens and the second fixed sub-lens are bonded into a fixed optical assembly, and the fixed optical assembly and the adjustable optical assembly are bonded, based on the relative positions determined by the active calibration. In the present example, the bonding of the fixed optical assembly and the adjustable optical assembly is achieved by bonding the second fixed sub-lens and the adjustable optical assembly. It should be noted that when all of the fixed lenses are located on the light exiting side, the first fixed sub-lens is located between the second fixed sub-lens and the adjustable optical assembly. At this moment, the bonding of the fixed optical assembly and the adjustable optical assembly is achieved by bonding the first fixed sub-lens and the adjustable optical assembly.

In the above various examples, the active calibration may include moving the light turning element in at least one moving direction of x-axis translation, y-axis translation, z-axis translation, rotation around an x-axis, rotation around a y-axis, and rotation around a z-axis. The x-axis coincides with the direction of a main optical axis of the telephoto optical imaging system (coinciding with the direction of an optical axis of a light exiting side of the fixed optical assembly), the y-axis is perpendicular to the x-axis and the z-axis, and the z-axis coincides with the direction of an optical axis of a light entering side of the fixed optical assembly. After the active calibration is completed, the light turning element and the light turning element mounting portion may be bonded by an adhesive material which is adapted to be cured by one or more of visible light, ultraviolet light, and baking.

In the above various examples, the adhesive material may be arranged, the active calibration may be completed, and then the adhesive material may be cured by one or more of visible light, ultraviolet light, and baking. Alternatively, the active calibration may be completed, the adhesive material may be arranged, two or more components for the active calibration may then be returned to the relative position determined by the active calibration, and the adhesive material may be finally cured by one or more of visible light, ultraviolet light, and baking.

The above description is merely illustrative of the preferred implementations of the present application and of the principles of the technology employed. It should be understood by those skilled in the art that the scope of the disclosure covered by the present application is not limited to the technical solution formed by the particular combination of technical features set forth above but is intended to cover other technical solutions formed by any combination of technical features set forth above or equivalents thereof without departing from the concept of the disclosure. For example, the above features and the technical features disclosed in the present application (but not limited to) having similar functions are replaced with each other to form a technical solution.

What is claimed is:

1. An adjustable optical assembly for an optical zoom module, characterized by the adjustable optical assembly comprising: a bearing base, a driving mechanism, a zoom optical assembly, and a compensating optical assembly,
   wherein the driving mechanism comprises:
   a bracket having a bottom end connected to the bearing base and a top end having a top groove open upwards;
   guide rods supported on the top groove and coinciding with the direction of optical axes of the zoom optical assembly and the compensating optical assembly;
   a zoom bearer having a first through hole, the zoom optical assembly being mounted in the first through hole;
   a compensating bearer having a second through hole, the compensating optical assembly being mounted in the second through hole;
   a zoom driving assembly comprising a zoom coil and a zoom magnetic element; and
   a compensating driving assembly comprising a compensating coil and a compensating magnetic element,
   wherein the zoom bearer is mounted on the guide rods and is slidable along the guide rods under the drive of the zoom driving assembly, the compensating bearer is mounted on the guide rods and is slidable along the guide rods under the drive of the compensating driving assembly, the zoom coil and the zoom magnetic element are fixed to the bearing base and the zoom bearer respectively, and the compensating coil and the compensating magnetic element are fixed to the bearing base and the compensating bearer respectively; and
   a height of a top surface of the guide rods does not extend beyond a top surface of the zoom bearer; or the height of the top surface of the guide rods is higher than the top surface of the zoom bearer, and a height difference between the top surface of the guide rods and the top surface of the zoom bearer is not more than 0.4 mm.

2. The adjustable optical assembly according to claim 1, wherein the first through hole is in a cut circle shape formed by cutting the top and bottom of a circle.

3. The adjustable optical assembly according to claim 2, wherein the guide rods include a first guide rod and a second guide rod, and the zoom bearer has a top side, a bottom side, a driving side, and a driven side facing away from the driving side, and the zoom driving assembly is disposed on the driving side, and the first guide rod is disposed on the driven side, and the second guide rod is disposed on the driving side.

4. The adjustable optical assembly according to claim 3, wherein the top side, bottom side and driven side of the zoom bearer have a top side wall, a bottom side wall and a driven side wall, respectively, and the top side wall and the bottom side wall have a smaller thickness than the driven side wall.

5. The adjustable optical assembly according to claim 3, wherein the driven side and driving side of the zoom bearer both have a guide rod mounting structure adapted to mount the first guide rod or the second guide rod.

6. The adjustable optical assembly according to claim 5, wherein the guide rod mounting structure is a lateral guide rod slot of which an opening direction is perpendicular to an opening direction of the top groove of the bracket.

7. The adjustable optical assembly according to claim 5, wherein the guide rod mounting structure is a guide rod through hole through which the guide rods pass.

8. The adjustable optical assembly according to claim 7, wherein the guide rod through hole has a rounded triangular cross-section, and a ball is disposed between the guide rods and the guide rod through hole.

9. The adjustable optical assembly according to claim 5, wherein the guide rod mounting structure includes a guide rod through hole or a guide rod slot, and the driving side of the zoom bearer has the guide rod through hole through which the guide rods pass, and the driven side of the zoom bearer has the lateral guide rod slot of which an opening direction is perpendicular to an opening direction of the top groove of the support.

10. The adjustable optical assembly according to claim 9, wherein the driving side of the zoom bearer has a groove-like structure in which the zoom magnetic element is embedded fixedly.

11. The adjustable optical assembly according to claim 10, wherein the zoom coil is fixed to the bearing base, and a shape of the zoom magnetic element is plate-like, and the zoom magnetic element has a surface facing the zoom coil.

12. The adjustable optical assembly according to claim 1, wherein the second through hole is in a cut circle shape formed by cutting the top and bottom of a circle.

13. The adjustable optical assembly according to claim 12, wherein the guide rods include a first guide rod and a second guide rod, and the compensating bearer has a top side, a bottom side, a driving side, and a driven side facing away from the driving side, and the compensating driving assembly is disposed on the driving side, and the first guide rod is disposed on the driven side, and the second guide rod is disposed on the driving side.

14. The adjustable optical assembly according to claim 13, wherein the driven side and driving side of the compensating bearer both have a guide rod mounting structure adapted to mount the first guide rod or the second guide rod.

15. The adjustable optical assembly according to claim 14, wherein the guide rod mounting structure includes a guide rod through hole or a guide rod slot, and the driving side of the zoom bearer has the guide rod through hole through which the guide rods pass, and the driven side of the zoom bearer has the lateral guide rod slot of which an opening direction is perpendicular to an opening direction of the top groove of the support.

16. The adjustable optical assembly according to claim 15, wherein the compensating bearer has a magnetic element mounting structure formed by extending outwards across the underneath of the second guide rod, and the compensating magnetic element is a bar magnet having an axis coinciding with the optical axis of the compensating optical assembly, and the bar magnet has an end connected to the magnetic element mounting structure and a free end, and the bar magnet is capable of extending into the compensating coil.

17. The adjustable optical assembly according to claim 1, including a housing, wherein the housing includes the bearing base and a cover adapted to the bearing base.

18. The adjustable optical assembly according to claim 1, wherein the bearing base includes a pad assembly, and the zoom driving assembly and the compensating driving assembly are both electrically connected to the exterior through the bearing base.

19. A periscopic optical zoom module, characterized by comprising:
a fixed optical assembly comprising a light turning element;
an adjustable optical assembly according to claim 1, wherein the zoom optical assembly is disposed between the light turning element and the compensating optical assembly; and
a photosensitive assembly, the compensating optical assembly being disposed between the zoom optical assembly and the photosensitive assembly.

* * * * *